United States Patent
Liu et al.

(10) Patent No.: US 12,069,113 B2
(45) Date of Patent: Aug. 20, 2024

(54) SPEAKER IDENTIFICATION-BASED ECHO DETECTION AND SOLUTION

(71) Applicant: Hewlett-Packard Development Company, L.P., Spring, TX (US)

(72) Inventors: Yibo Liu, Boxborough, MA (US); David A. Bryan, Austin, TX (US); Stephen C. Botzko, Reading, MA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/963,244

(22) Filed: Oct. 11, 2022

(65) Prior Publication Data

US 2024/0121282 A1 Apr. 11, 2024

(51) Int. Cl.
*H04L 65/4038* (2022.01)
*G10L 17/02* (2013.01)
*H04M 9/08* (2006.01)

(52) U.S. Cl.
CPC .......... *H04L 65/4038* (2013.01); *G10L 17/02* (2013.01); *H04M 9/082* (2013.01)

(58) Field of Classification Search
None
See application file for complete search history.

(56) References Cited

U.S. PATENT DOCUMENTS

| | | | |
|---|---|---|---|
| 7,113,580 B1 * | 9/2006 | DellaMorte, Sr. | H04M 3/002 379/202.01 |
| 8,126,129 B1 * | 2/2012 | McGuire | H04M 3/568 379/202.01 |
| 8,489,884 B2 | 7/2013 | Srinivasan | |
| 9,025,764 B2 | 5/2015 | Chu et al. | |
| 9,728,188 B1 | 8/2017 | Rosen et al. | |
| 10,652,679 B1 * | 5/2020 | Boss | H04L 65/1083 |
| 10,743,107 B1 | 8/2020 | Yoshioka et al. | |
| 2008/0084969 A1 * | 4/2008 | Moore | H04L 65/1083 379/52 |

(Continued)

OTHER PUBLICATIONS

Brecht Desplanques et al., ECAPA-TDNN: Emphasized Channel Attention, Propagation and Aggregation in TDNN Based Speaker Verification, arXiv:2005.07143v3 [eess.AS] Aug. 10, 2020.

(Continued)

*Primary Examiner* — Scott B Christensen
(74) *Attorney, Agent, or Firm* — Quarles & Brady LLP

(57) ABSTRACT

A video conference call control system is provided with an audio mixer to receive an audio speech signal at one or more network devices connected to the video conference call; to generate first and second talker identification values from the audio speech signal; to compare the first and second talker identification values during a timing comparison window to determine if the first and second talker identification values are identical and received simultaneously or substantially contemporaneously; and to selectively mute one or more audio devices at the network device(s) if the first and second talker identification values are identical and received simultaneously or substantially contemporaneously so that microphone input signals to the audio mixer are muted to prevent "playback" echo effects and so that microphone input and audio loudspeaker output signals to the audio mixer are muted to prevent "double join" echo effects.

21 Claims, 10 Drawing Sheets

(56) References Cited

U.S. PATENT DOCUMENTS

| | | | | |
|---|---|---|---|---|
| 2010/0061535 | A1* | 3/2010 | Diethorn | H04M 3/568 |
| | | | | 379/202.01 |
| 2010/0324891 | A1* | 12/2010 | Cutler | G10L 25/78 |
| | | | | 381/122 |
| 2015/0078581 | A1* | 3/2015 | Etter | H04R 3/005 |
| | | | | 381/92 |
| 2023/0291840 | A1* | 9/2023 | Loiko | H04M 9/082 |
| | | | | 379/406.08 |
| 2023/0297321 | A1* | 9/2023 | Zhang | G10L 17/04 |
| | | | | 704/243 |

OTHER PUBLICATIONS

Alvin F. Martin et al., Speaker Recognition in a Multi-Speaker Environment, European Conference on Speech Communication and Technology | 7th | | ISCA, Sep. 1, 2001.

Nauman Dawalatabad et al., ECAPA-TDNN Embeddings for Speaker Diarization, arXiv:2104.01466v1 [eess.AS] Apr. 3, 2021.

Github, The SpeechBrain Toolkit, https://github.com/speechbrain/speechbrain, downloaded from the Internet Sep. 2, 2022.

Rupali Pawar et al., Speaker Identification using Neural Networks, International Enformatika Conference, IEC'05, Aug. 26-28, 2005, Prague, Czech Republic, Jan. 2005 https://www.researchgate.net/publication/221017797_Speaker_Identification_using_Neural_Networks.

Speechbrain, Speaker Verification with ECAPA-TDNN embeddings on Voxceleb, downloaded from the Internet Sep. 2, 2022, https://huggingface.co/speechbrain/spkrec-ecapa-voxceleb.

* cited by examiner

SPEAKER IDENTIFICATION-BASED ECHO DETECTION AND SOLUTION

BACKGROUND

Technical Field

This disclosure is directed in general to videoconferencing. In one aspect, the disclosure relates to techniques for controlling how multiple meeting participants join a video conference.

Description of the Related Art

While video conferencing room systems lower the barrier to connection, there are numerous technical challenges for seamlessly integrating audio and video information from different conference participants due to interface constraints of the networked computer devices which are connected into a video conference. One of the major problems that occurs with both video and audio conferencing is that acoustic echo effects can occur when multiple versions of an acoustic signal are captured and processed for playback by a conferencing system. For example, "double join" echo effects can occur when an in-room meeting participant seeks to share or view meeting content on their personal computer or laptop while a video meeting is in progress, resulting in conference audio (e.g., voices or sounds from in-room meeting participants) being picked up and played back by the audio systems (e.g., microphone and speakers) at the in-room meeting participant's personal computer or laptop and at the video conference unit so that multiple copies of conference audio are captured through multiple microphones and played back through the conference audio loudspeakers, causing audio feedback screeches, echoes, and otherwise undesirable experiences for the meeting participants. In addition, "playback" echo effects can occur when conference audio generated by an audio loudspeaker is captured by a microphone and fed back into the conference system. Such acoustic echo effects can be heard as acoustic feedback or as delayed audio (that is, echo) that occurs when the delayed versions of an acoustic signal are captured and played back by the conferencing system. The challenges of dealing with acoustic echo effects are exacerbated with conferencing systems where multiple computer systems, each having separate microphones and loudspeakers, are networked together in a common room or are connected over a distributed network of computer systems that are not located together.

While existing conferencing systems often include acoustic echo cancellation solutions which mitigate some of the acoustic echo effects, these solutions do not provide robust and comprehensive protection against acoustic echo effects. For example, each networked computer device connected to a video conference may include echo cancellation algorithms or systems which eliminate echo effects caused when audio output by a loudspeaker of a networked device is acoustically coupled to a microphone at the same networked device. In operation, such echo cancellation algorithms or systems are operative to subtract the audio signal emitted from the loudspeaker from the audio signal captured by the microphone. If the echo canceller at any networked computer device fails in a conference, then the user(s) at the networked computer device with the failed echo canceller will hear normal audio with no echo, but the users at other endpoints in the conference will hear echo. This makes it difficult to diagnose the location of a particular networked device where the echo cancelation failure occurred. As seen from the foregoing, existing echo cancellation systems can sometimes be defective or otherwise fail to subtract the acoustically coupled audio output from the loudspeaker. Another limitation of existing echo cancellation systems is that they do not address the "double join" echo effect that arises when microphones at different conference participant computer devices capture audio or acoustic information generated by a conference participate (e.g., someone talking). In addition, there are real costs resulting from conventional video conferencing room systems, including internet bandwidth that is consumed during double-join events, lost productivity caused by the time required to manually join a meeting and mute the required audio systems, and diluted user experience from interrupted meeting flow. As seen from the foregoing, existing video conferencing room systems suffer from a number of design drawbacks and performance deficiencies.

SUMMARY

A method, apparatus, system, and computer program product are provided for controlling acoustic echo effects during an audio/video conference call by using talker ID values generated from audio speech signals captured at two or more network devices participating in the audio/video conference call. In operation, an audio mixer is configured to determine that an acoustic echo effect is present upon detecting that duplicate copies of a unique talker ID value are generated or received at the same time by the audio/video conference system. In addition, the audio mixer is configured to mitigate the acoustic echo effect(s) by selectively muting audio devices (microphone and/or speaker) at one of the network devices from which a duplicate copy of the unique talker ID value was generated or received. To determine if duplicate talker ID values are received at the same time, the relative timing of the talker ID values may be evaluated at the audio/video conference system using a timing comparison window having a predetermined duration (e.g., within a range of approximately 100-500 msec). In selected embodiments, the unique talker ID values are generated, respectively, from received audio (microphone) input signals that are captured at microphone transducers of first and second network devices, and may be compared at a centralized audio mixer unit or at a plurality of distributed or "mesh" audio mixers to detect duplicate copies of the talker ID. In other embodiments, the unique talker ID values are generated at a central server unit (e.g., a video conference unit or conference server) which is connected to receive digital versions of the audio speech signal from the first and second network devices. In other embodiments, the unique talker ID values are generated, respectively, from received audio (microphone) input signals and from generated audio (loudspeaker) output signals that are generated at a single endpoint network device, and may then be compared at the endpoint network device to detect duplicate copies of the talker ID. As disclosed herein, each of the unique talker ID values may be generated by using any suitable talker identification/recognition technology to generate a multi-digit talker ID number from a receiving audio speech signal at a receiving network device, where the multi-digit talker ID number uniquely identifies a speaker associated with the audio speech signal. In addition, each receiving network device may also optionally generate location data that is associated with the unique talker ID value for use in identifying a physical location of the receiving network device, where the location data may be related to the network topology and/or may specify a physical location in terms of whether the talker is in the same physical space as the endpoint(s). For example, the generated location data may specify the talker location as "local" or "remote" without requiring the actual location. Once an acoustic echo effect is detected, the audio/video conference system mitigates the acoustic echo effect(s) by following a defined sequence of steps for selectively muting the audio devices at an endpoint network device where a duplicate talker ID is generated. As a first step, the audio/video conference system determines if the acoustic echo effect is caused by a failed echo canceller at the endpoint network device, in which case only the audio (microphone) input signals are muted from the endpoint network device to prevent "playback" echo effects. However, if the acoustic echo effect is not caused by a failed echo canceller at the endpoint network device, then the audio/video conference system mutes both the audio (microphone) input and audio (loudspeaker) output signals at the endpoint network device to prevent "double join" echo effects.

BRIEF DESCRIPTION OF THE DRAWINGS

The present disclosure may be understood, and its numerous objects, features and advantages obtained, when the following detailed description of a preferred embodiment is considered in conjunction with the following drawings.

DETAILED DESCRIPTION

Figure 1:
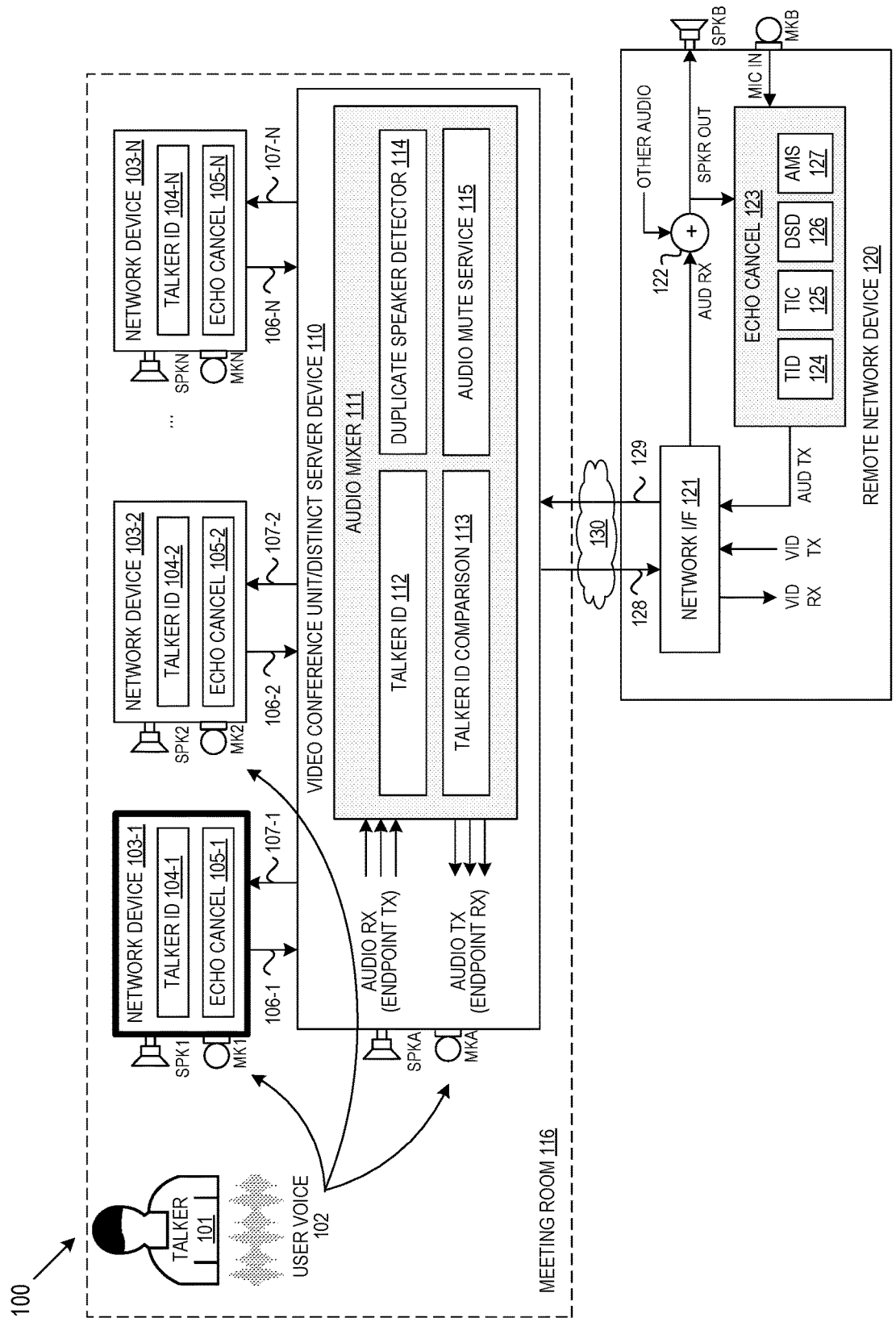
FIG. 1 is simplified system level architecture block diagram illustrating a video conferencing system using a centralized audio mixer to control acoustic echo effects using talker identification (ID) values in accordance with selected embodiments of the present disclosure.

A system, apparatus, methodology, and computer program product are described for detecting and preventing acoustic audio effects, such as "double join" echo effects and "playback" echo effects, with an efficient and effective approach for using talker ID values to identify the type of acoustic audio effect and then applying appropriate automatic and/or by notifying the user(s) of the problem so they can be manually resolved. In operation, the disclosed solution starts by generating talker ID values from speaking voices that are monitored at two or more network devices connected in a video conference call. In addition, the disclosed solution compares the talker ID values within defined comparison windows to detect the presence of duplicate talker ID values and to distinguish different types of acoustic echo effects. Based upon the type of detected acoustic echo effect, the disclosed solution then selectively mutes the audio devices (microphone and/or speaker) at one of the network devices from which a duplicate talker ID value was generated or received, either automatically or by prompting the user to mute audio devices.

By way of background information, it is known to those skilled in the art that acoustic echo effects can occur in both video and audio conferencing whenever audio is rendered through loudspeakers and captured through room microphones, thereby generating an acoustic feedback or delayed audio or echo signal. A first type of acoustic audio effect is a "double join" echo effect that occurs when two conference call endpoints join the same conference from the same meeting room or location, thereby enabling two different endpoint microphone inputs to capture audio inputs (e.g., speaking voices) in the meeting room or location. In addition, the voices of people speaking in the room are played out from different endpoint loudspeaker outputs in the room, resulting in significant echo which is heard both in the local room and at all other sites in the conference. This echo is often accompanied by feedback ("howling" tones). "Double join" echo effects can happen in an audio conference when a person using their mobile phone as a speakerphone enters the room where a second speakerphone is in the same conference call, but are more commonly a problem in a video conference where a meeting participant seeks to view or share content by using a personal laptop computer as the user's networked device to join the meeting. Another common type of acoustic audio effect is a "playback" echo effect that occurs when there is a failure of the echo canceller at an endpoint network device that is participating in a conference call, thereby enabling the microphone at the endpoint network device to capture audio inputs (e.g., speaking voices) that were generated by the output loudspeakers of the endpoint network device. As seen from the foregoing, "double join" echo effects only occur when the two endpoint network devices are in the same room, while "playback" echo effects from a failed echo canceller occur when the two endpoint network devices are in different rooms. Both types of acoustic echo effects disrupt the conference experience and are difficult even for experienced video conferencing participants to diagnose and mitigate the problem.

Various illustrative embodiments of the present invention will now be described in detail with reference to the accompanying figures. In the drawings and the description of the drawings herein, certain terminology is used for convenience only and is not to be taken as limiting the examples of the present disclosure. In the drawings and the description below, like numerals indicate like elements throughout. Throughout this disclosure, terms are used in a manner consistent with their use by those of skill in the art. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified block diagrams and schematic circuit block diagrams without including every circuit element or detail in order to avoid limiting or obscuring the present invention. Such descriptions and representations are used by those skilled in the art to describe and convey the substance of their work to others skilled in the art. It is also noted that, throughout this detailed description, certain elements in the figures are illustrated for simplicity and clarity and have not necessarily been drawn to illustrate specific details. Furthermore, the described features, advantages, and characteristics of the invention may be combined in any suitable manner in one or more embodiments. One skilled in the relevant art will recognize, in light of the description herein, that the embodiments can be practiced without one or more of the specific features or advantages of a particular embodiment. In other instances, additional features and advantages may be recognized in certain embodiments that may not be present in all embodiments. For example, selected aspects are depicted with reference to simplified circuit schematic drawings without including every circuit detail in order to avoid limiting or obscuring the present invention. Such details are well known and not considered necessary to teach one skilled in the art of how to make or use the present invention.

To provide additional details for an improved understanding of selected embodiments of the present disclosure, reference is now made to FIG. 1 which shows simplified system level architecture block diagram illustrating a video conferencing system 100 using a centralized audio mixer 111 to control acoustic echo effects using talker identification (ID) values. As depicted, the video conferencing system 100 includes one or more network devices 103-1, 103-2, 103-N, 120 which may be connected in a network to a video conference unit and/or distinct server device 110 to conduct a video or web conference call meeting. In this sense, each of the network devices 103, 120 and video conference unit/server device 110 may be considered to be network devices by virtue of being connected in a network. In selected embodiments, each of the network devices 103, 120 and video conference unit/server device 110 may include internet protocol (IP) microphones, video conference units, video conference controllers, headsets, speakerphones, smartphones, laptop devices, etc. In selected embodiments, network devices 103 in a conference room or area 116 that are connected in a video or web conference call meeting can include video bars, conference room controllers, wireless microphones, video cameras with microphones, video conference units, laptop computers, etc. As will be appreciated, the video conference unit/server device 110 may be formed with two or more physically separate or distinct server devices, but can also be consolidated into a single server device which is located in the same meeting room 116 as the network devices 103 or which is located externally (e.g., in the "cloud"). And while the drawing in FIG. 1 shows the video conference unit/server device 110 server in the same room 116 as the endpoint systems 102, the video conference unit/server device 110 would ordinarily not be in the same room 116, but would instead be located in the cloud or in an on-premise server room, in which case it would not have microphones MKA or a speaker SPKA. Each of the network devices 103, 120 and video conference unit/server device 110 can include network information, such as an IP address, media access control (MAC) address, serial number (S/N), or the like, that is used to identify a network location for each network device. In this way, the functionality of the video conference unit and/or server device 110 is discoverable and reachable by all network devices 103, 120.

In selected embodiments, each of the network devices 103, 120 and video conference unit/server device 110 may be implemented as an information handling system as further described herein, and described elements of information handling system, including a processor(s), memory, and I/O devices, such as a microphone MK and speaker SPK. In addition, each of endpoint network devices 103 is connected and configured to exchanges messages 106, 107 over a wired or wireless network to communicate with the video conference unit/server device 110. Similarly, the remote network device 120 exchanges messages 128, 129 over an external network 130 to communicate with the video conference unit/server device 110.

In addition, one or more of the endpoint network devices 103, 120 may include an echo cancellation unit 105, 123 which is connected and configured to prevent echo effects created on the video/web conference call when audio generated by a network device loudspeaker SPK1-N, SPKB is captured by the corresponding microphone MK1-N, MKB. For example, the remote network device 120 includes an echo cancellation unit 123 which eliminates echo effects caused when the audio speaker output SPKR OUT generated by the loudspeaker SPKB is acoustically coupled onto the input microphone line MIC IN by the microphone MKB. In operation, the remote network device 120 is connected to receive the far end audio input signal 128 from the VCU 110 at the network interface (I/F) module 121 where it is decompressed and output as the received audio signal AUD RX which is to be provided as the speaker output signal SPKR OUT to the loudspeaker SPKB at the remote network device 120. As will be appreciated, there may be other audio that is mixed into the received audio signal AUD RX, as indicated by the mixer element 122, prior to output and echo cancellation processing. For instance, in a PC, audio notifications from other applications and local content audio will be mixed into the received audio signal AUD RX, and the combined signal is sent as the speaker output signal SPKR OUT to the loudspeaker SPKB. In order to prevent echo feedback effects caused when audio generated by the loudspeaker SPKB is captured by the input microphone MKB, the microphone MKB is connected to provide the digital input signal "MIC IN" to the echo cancellation unit 123 which is operative to subtract the speaker output signal SPKR OUT (that is emitted from the loudspeaker SPKB) from the digital audio input signal "MIC IN" (that is captured by the microphone MKB) when generating the echo-cancelled transmit audio signal AUD TX that is provided to the network I/F module 121 for compression and transmission 129 to the VCU 110. Other processing (for example, noise reduction) may also be done in the echo canceller 123. However, echo cancellation algorithms only work when there is a linear relationship between the electrical signal going to the loudspeaker transducer (audio out) and the electrical signal of the sound captured by the microphone transducer (audio in), so any transducer distortion will result in a failure of the echo cancellation algorithm. Similarly, distortion of the electronic signals (for instance, clipping) will also result in a failure of the echo cancellation algorithm.

As depicted, the video conference unit/server device 110 receives and decompresses the transmit audio signal AUD TX signals received from the various endpoint network devices 103-1, 103-2, 103-3, 120 that are participating in the in the conference call. (Note that these received signals are denoted as input audio signals AUD RX in the video conference unit/server device 110). These received audio input signals AUD RX are input to the audio mixer 111 which is configured to generate a "mix-minus" output signal AUD TX for each endpoint network device. In particular, the audio mixer 111 generates, for each endpoint network device, a corresponding output signal AUD TX from the various audio input signals AUD RX that does not include the audio input signal AUD RX received from the endpoint network device itself. The audio mixer 111 may be configured to mix selectively—dropping audio from endpoints where speech is not detected in order to reduce audio noise. In addition, the meeting host can mute endpoints at the video conference unit/server device 110. In addition, the audio mixer 111 may include other signal processing functions, such as automatic gain control.

In the disclosed video conferencing system 100, the centralized audio mixer 111 may be configured to control acoustic echo effects during an audio/video conference call by including or accessing a talker ID application or software module 112, a talker ID comparison application or software module 113, a duplicate speaker detector application or software module 114, and an audio mute service application or software module 115. In addition or in the alternative, each of the remote network devices 103, 120 may also include corresponding application or software modules that may be used for controlling acoustic echo effects during an audio/video conference call.

As disclosed herein, the talker ID application or software module 112 is configured to generate unique talker ID values for each detected speaking voice generated by an individual user or talker 101 in the meeting room 116. To this end, the audio mixer 111 controls a microphone MKA at the VCU 110 to generate audio voice data from a received speaking voice waveform 102. In addition, the audio mixer 111 applies the talker ID application 112 to process the audio voice data and to generate a talker ID or signature which uniquely identifies the speaking voice. In various implementations, the unique talker ID is associated with a number identifier. For example, the number identifier can be represented by a unique 192 digit number. In operation the talker ID application 112 may run continuously to detect speaking voices at the VCU 110 and to generate corresponding talker ID values. In similar fashion, each of the network devices 103-1, 103-2, 103-N may include a talker ID application or software module 104-1, 104-2, 104-N. Likewise, the remote network device 120 may include a talker ID application or software module 124. When the network devices 103, 120 have their audio microphone devices MK1-MKN enabled to detect speaking voices in the meeting room 116, the talker ID application/software module 104 is configured to generate talker ID values in response to detecting a received speaking voice waveform 102. Similarly, when the audio microphone device MKB is enabled at the remote network device 120 to detect speaking voices, the talker ID application/software module 124 is configured to generate talker ID values in response to detecting a received speaking voice waveform generated near or by the remote network device 120.

Using the same talker identification algorithms as the talker ID application/software module 112, each talker ID application/software module 104-1, 104-2, 104-N, 124 generates unique talker ID values to identify a corresponding speaker based on audio voice data generated by the speaking voice. As disclosed herein, each talker ID application/software module 104, 112, 124 may employ any suitable talker identification or recognition algorithm which enables the identification of a person who is speaking from characteristics of the audio voice data generated by the speaking person. Talker identification/recognition operates to uniquely identify a talker by using a microphone to convert a received voice signal from a talker into audio voice data and then associate the audio voice data with a unique talker ID data or unique signature that is specific to the talker. In selected embodiments, the unique signature is associated with a number identifier, such as a unique 192 digit number. Talker identification tasks include methods for acquiring, processing, analyzing and understanding audio voice data, and extraction of high dimensional data from the real world to produce numerical or symbolic information which uniquely identifies a talker. Talker identification is concerned with artificial systems that extract information from audio data. Talker identification includes algorithms which receive an audio voice data file as input and produce data detailing the speaker identification characteristics that a system has been trained to detect. In selected embodiments, the talker ID values may be generated using any suitable speaker encoding model to recognize and identify a unique talker associated with a speaking voice. For example, a speaker-embedding model for speaker recognition, such as the Emphasized Channel Attention, Propagation, and Aggregation in Time Delay Neural Network (ECAPA-TDNN) model may be used to generate talker ID values, though other speaker encoding models can also be used.

In other embodiments, neural networks—also known as artificial neural networks (ANNs) or simulated neural networks (SNNs)—are a subset of machine learning which may be used to generate the talker ID values that uniquely identify different speaking voices. A convolutional neural network is a class of deep neural network which can be applied analyzing audio voice data. A deep neural network is an artificial neural network with multiple layers between the input and output layers. Artificial neural networks are computing systems inspired by the biological neural networks that constitute animal brains. Artificial neural networks exist as code being executed on one or more processors. An artificial neural network is based on a collection of connected units or nodes called artificial neurons, which mimic the neurons in a biological brain. Each connection, like the synapses in a biological brain, can transmit a 'signal' to other neurons. An artificial neuron that receives a signal then processes it and can signal neurons connected to it. The signal at a connection is a real number, and the output of each neuron is computed by some non-linear function of the sum of its inputs. The connections are called edges. Neurons and edges have weights, the value of which is adjusted as 'learning' proceeds and/or as new data is received by a state system. The weight increases or decreases the strength of the signal at a connection. Neurons may have a threshold such that a signal is sent only if the aggregate signal crosses that threshold.

As described hereinbelow, the talker ID values generated by the talker ID application/software modules 104, 112, 124 at different networked devices are used to detect and mitigate "double-join" and/or "playback" echo events. To this end, the audio mixer 111 includes or accesses the talker ID comparison service 113 to receive and compare talker ID values identified at two or more network devices 103, 110, 120 within a predetermined timing comparison window. In addition, the audio mixer 111 includes or accesses the duplicate speaker detector service 114 to detect the presence of duplicate talker ID values to determine if they are the same and are received at approximately the same time or substantially contemporaneously, thereby indicating that a meeting participant's speaking voice is being captured by two or more network devices 103, 110, 120. Finally, the audio mixer 111 includes or accesses the audio mute service 115 to selectively mute audio devices (microphone and/or speaker) at one of the network devices where a duplicate talker ID value was generated or received.

To address a "double join" situation where a network device (e.g., 103-1) in the meeting room 116 seeks to view or share content while joining the conference call being run by the video conference unit/server device 110, any speaking voice 102 detected at the conferenced network devices (e.g., 103-1, 110) may be processed with the talker ID application/software modules 104, 112 to generate corresponding talker ID values for the speaking voice 102. Each talker ID value uniquely identifies a corresponding speaking voice based on audio voice data generated by the speaking voice, and may include or be associated with device or location information identifying the network device where the speaking voice is detected. By using the talker ID comparison service 113 and the duplicate speaker detector service 114 to compare detected talker ID values within a predetermined timing comparison window, the audio mixer 111 is able to detect a "double join" echo effect from duplicate talker ID values generated by the user's network device (103-1) and the one or more additional network devices (e.g., the video conference unit/server device 110) in the meeting room 116. As disclosed herein, the duration of the timing window may be controlled to detect if the two devices are in the same room or not, such as by setting the timing window duration to account for the distance between the talker and any detecting microphones at the network devices, to account for potentially different audio processing delays in the two network devices, and/or to account for potentially different network delays between the network devices and any server performing the talker ID value comparison. This comparison determination from the duplicate speaker detector service 114 is indicative that a meeting participant's speaking voice is being captured by two or more network devices 103 in the same room or area 116. In selected embodiments where identical talker ID values are generated by the VCU 110 and one or more of the in-room network devices 103, the duplicate speaker detector service 114 identifies any in-room network device 103 as a "joining" network device. In other embodiments where identical talker ID values are generated, the duplicate speaker detector service 114 may be configured to identify which of the network devices 103 is generating a duplicate speaker ID value by analyzing the relative timing of when the speaking voice waveform 102 is captured at each network device as a digital audio input signal to tell which digital audio input signal is captured first (or last). Alternatively, the duplicate speaker detector service 114 may be configured to determine which talker ID value is sent first (or last). While the duplicate speaker detector service 114 may be configured to identify an in-room network device 103 as a "joining" network device which is creating a double joint event, the duplicate speaker detector service 114 may, in some cases, be configured to identify the VCU 110 as the "joining" network device. In response to detecting a "double join" echo effect, the audio mixer 111 includes or accesses the audio mute service 115 to selectively disable the audio devices (microphone and speaker) of the user's network device, either automatically or manually by providing a user prompt, thereby preventing audio feedback screeches, echoes, and otherwise undesirable experiences for the meeting participants. However, if the "joining" network device 103 is sharing content (e.g., a presentation with content audio) with the video/web conference call, then the PC output audio from the "joining" network device 103 will not be disabled or muted, allowing the content audio to be shared. In this case, any verbal or speaking input from the user of the "joining" network device 103 will not be captured by the (disabled) microphone at the "joining" network device 103, but will instead be captured by the microphone MKA of the VCU 110.

To address a "playback" echo situation where the echo canceller (e.g., 123) at an endpoint network device 120 has failed, any "playback" speaking voice—which is generated when the audio output by a loudspeaker SPKB at the endpoint network device 120 is acoustically coupled to a microphone MKB at the same endpoint network device 120—may be processed with the talker ID application/software module 112 (or alternatively, the talker ID (TID) module 124) to generate a corresponding talker ID value which may include or be associated with device or location information identifying the endpoint network device 120 where the "playback" speaking voice is detected. In the case of a failed echo canceller 123, the talker ID value is generated from the "playback" speaking voice included in the transmit audio signal AUD TX that is output by the (failed) echo canceller 123, and thus can be processed at either the audio mixer 111 or the remote network device 120. By using the talker ID comparison service 113 and the duplicate speaker detector service 114 to compare detected talker ID values within a predetermined timing comparison window, the audio mixer 111 is able to detect a "playback" echo effect from duplicate talker ID values generated by the remote network device 120 and one or more of the network devices 103 or the video conference unit/server device 110. Alternatively, the duplicate talker ID values can be detected with the talker ID comparison (TIC) service 125 and duplicate speaker detector (DSP) service 126 included in the remote network device 120. Depending on where the duplicate talker ID value detection function is performed (e.g., at a centralized location or at the endpoint network device), the duration of the timing window is controlled to detect a "playback" echo effect from duplicate talker ID values to account for the distance between the talker and any detecting microphones at the network devices, to account for potentially different audio processing delays in the network devices, and/or to account for potentially different network delays between the network devices and any server performing the talker ID value comparison. In response to detecting a "playback" echo effect, the audio mixer 111 includes or accesses the audio mute service 115 (or alternatively, the audio mute service (AMS) 127) to selectively disable the audio input device (microphone) of the remote network device 120, either automatically or manually by providing a user prompt, thereby preventing audio feedback screeches, echoes, and otherwise undesirable experiences for the meeting participants. While the audio muting service 115 may be configured to mute both the microphone MKB and loudspeaker SPKB of the remote network device 120, this may result in the remote participants not hearing any audio at all, at which point they may disconnect the call and try calling in again, likely getting the same result. So, the best response is to only mute the microphone MKB of the remote network device 120.

As seen from the foregoing, the centralized audio mixer 111 may be configured to use talker ID values to detect when two or more video conference participants in a meeting room or area attempt to join a video or web conference call meeting that is occurring in the meeting room or area. In addition or in the alternative, the centralized audio mixer 111 may be configured to use talker ID values to detect when the video or web conference call meeting is joined by one or more remote meeting participants who use remote endpoint devices (e.g., laptops) which produce audio echoes, such as can arise when the remote endpoint device(s) have defective audio echo cancellation behavior. When matching talker ID values that are substantially contemporaneously generated and detected, the centralized audio mixer 111 may be configured to automatically and selectively mute audio devices (e.g., microphone and/or speaker) at a network device associated with a duplicative talker ID value, depending on whether "double-join" and/or "playback" echo effect is detected. Alternatively, the centralized audio mixer 111 may be configured to issue a prompt to the network device associated with a duplicative talker ID value to selectively mute its audio devices.

As disclosed herein, the muting response for "double join" events (namely, muting both the microphone and loudspeakers) is different from the muting response for "endpoint echo" events (namely, muting only the microphone). To provide a differentiated muting response for these events, the speaker identification/recognition technology 112-115 should be configured to detect substantially contemporaneous matching talker ID values being generated from the endpoint microphones, and should also be configured to evaluate location information from each endpoint (such as an IP address). With the approach, "double join" events may be identified from duplicate talker ID values which are generated by local endpoints (e.g., network devices 103 in the meeting room 116), and "playback echo" events are identified from duplicate talker ID values which are generated by remote endpoints (e.g., network device 120). An alternative approach is for the audio mute service 115 to deploy an escalating muting service whereby any duplicate network work device identified from matching talker ID values has its loudspeaker muted first to see if that eliminates the talker ID match, effectively addressing any endpoint echo events first. And if the talker ID match continues to be detected after the loudspeaker is muted, then the audio mute service 115 also mutes the microphone of the duplicate network device, effectively addressing any "double join" event(s). And if this resolves the generation of duplicate talker IDs, then the audio mute service 115 unmutes the loudspeaker. While the use of an escalating muting service will slow down the "double join" response, it provides an effective approach for sequentially addressing both "double join" and "endpoint echo" events.

Figure 2:
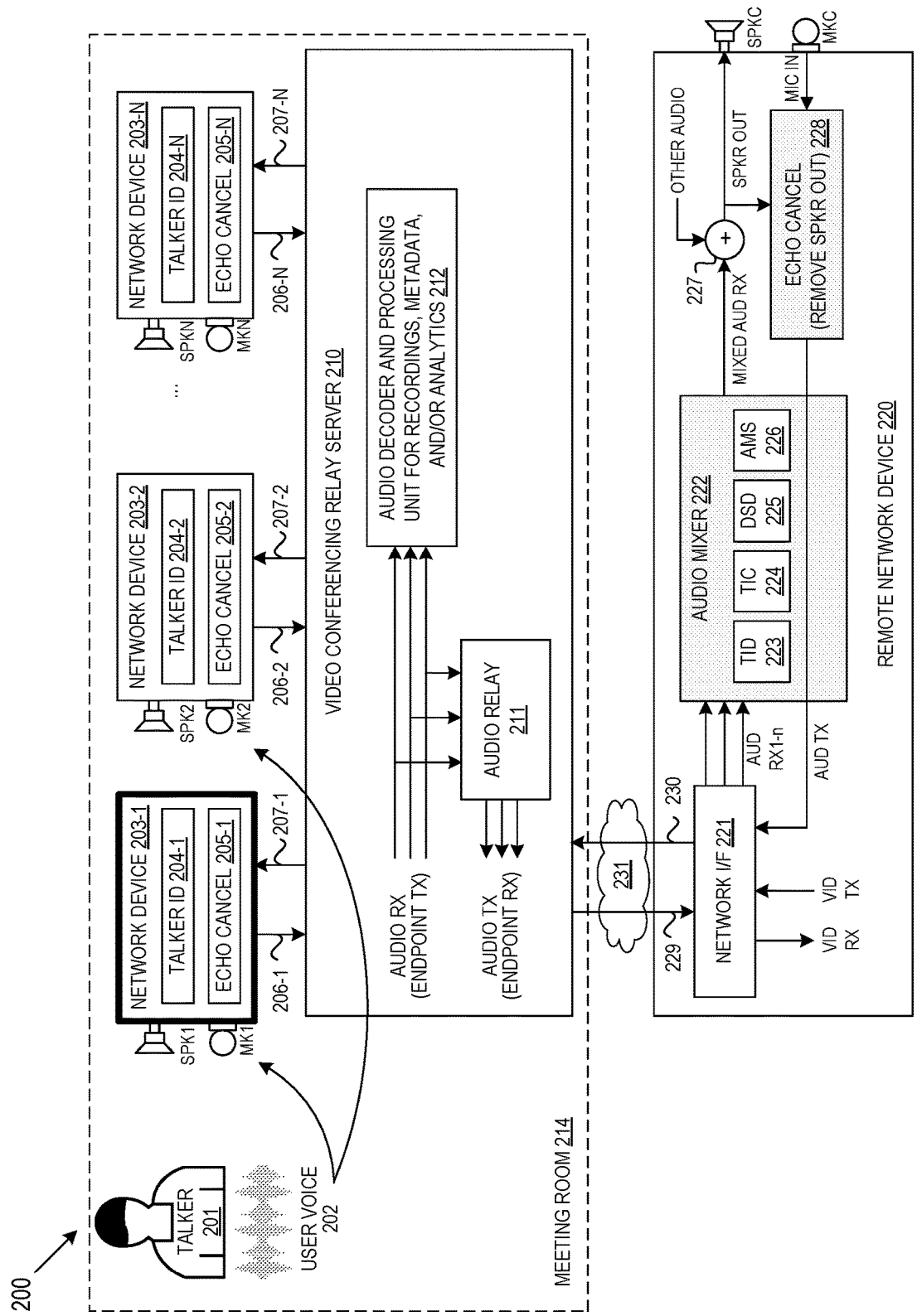
FIG. 2 is simplified system level architecture block diagram illustrating a video conferencing system using decentralized audio mixers to control acoustic echo effects using talker ID values in accordance with selected embodiments of the present disclosure.

In addition to the centralized audio mixer architecture, another commonly used audio/visual conference system architecture employs distributed audio mixers at the video conferencing endpoints. This is often used in "mesh" conferencing. To provide additional details for an improved understanding of selected embodiments of the present disclosure, reference is now made to FIG. 2 which shows a simplified system level architecture block diagram illustrating a video conferencing system 200 using a decentralized audio mixer 222 to control acoustic echo effects using talker ID values. As depicted, the video conferencing system 200 includes one or more network devices 203-1, 203-2, 203-N, 220 which may be connected in a network to a video conferencing relay server 210 to conduct a video or web conference call meeting. Similar to FIG. 1, each of the network devices 203, 220 includes an echo cancellation unit 205, 228 which is connected and configured to prevent echo effects created on the video/web conference call when audio generated by a network device loudspeaker SPK1-N, SPKC is captured by the corresponding input microphone MK1-N, MKC. Each network device 203, 220 also includes a talker ID application or software module 204, 223 that is configured to generate unique talker ID values for each speaking voice detected at the corresponding input microphone MK1-N, MKC. In addition, each of network devices 203 is connected and configured to exchanges messages 206, 207 over a wired or wireless network to communicate with the video conferencing relay server 210. Similarly, the remote network device 220 exchanges messages 229, 230 over an external network 213 to communicate with the video conferencing relay server 210. In selected embodiments, each of the network devices 203, 220 and video conference unit/server device 110 may be implemented as an information handling system as further described herein, and described elements of information handling system, including a processor(s), memory, and I/O devices.

In the distributed audio mixer architecture, the video conferencing relay server 210 does not include an audio mixer functionality or any talker ID application or software module. Instead, the video conferencing relay server 210 acts as a centralized conferencing server which includes an audio relay unit 211 which acts as a relay for receiving audio and video input signals (e.g., AUD RX) that have been transmitted by one or more endpoint network devices 203, 220, and for relaying or transmitting audio and video input signals (e.g., AUD TX) to the endpoint network devices 203, 220. In selected embodiments, the video conferencing relay server 210 may include an audio decoder and processing unit 212 which is configured to decode and process the audio and video input signals (e.g., AUD RX) to allow for recording, derivation of metadata, and analytics.

Instead of having a centralized audio mixing function, one or more of the endpoint network devices (e.g., 220) includes a network interface (I/F) unit 221 and audio mixer 222 which are connected to receive and process audio and video input and output signals. In particular, the network I/F units 221 is connected to receive far end audio input signals 229 relayed from the video conferencing relay server 210, and to generate audio input signals AUD RX1-$n$ which are provided to the audio mixer 222 for mixing to generate a mixed audio signal (MIXED AUD RX) for output to the echo canceller 228. However, there may be other audio (e.g., audio notifications from other applications and local content audio) that is mixed into the mixed audio signal MIXED AUD RX, as indicated by the mixer element 227, prior to output and echo cancellation processing. Thus connected, the remote network device 220 receives the far end audio input signal(s) 229 from the video conferencing relay server 210 at the network I/F module 221 where it is decompressed and output as the received audio input signals AUD RX1-$n$ which are provided to the audio mixer 222.

In order to prevent echo feedback effects caused when audio generated by the loudspeaker SPKC is captured by the input microphone MKC, the microphone MKC is connected to provide the digital input signal "MIC IN" to the echo cancellation unit 123 which is operative to subtract the speaker output signal SPKR OUT (that is emitted from the loudspeaker SPKC) from the digital audio input signal "MIC IN" (that is captured by the microphone MKC) when generating the echo-cancelled transmit audio signal AUD TX that is provided to the network I/F module 221 for compression and transmission 229 to the video conferencing relay server 210. Other processing (for example, noise reduction) may also be done in the echo canceller 228. However, since echo cancellation performance can sometimes be defective, the audio mixer 222 is connected to receive the audio input signals AUD RX1-n (from the various endpoint network devices 103 that are participating in the conference call) and the transmit audio signal AUD TX signals (received from the echo canceller 228). At the audio mixer 222, the received audio input signals AUD RX1-n, AUD TX are processed to control acoustic echo effects during an audio/video conference call with the talker ID (TID) application or software module 223, talker ID comparison (TIC) application or software module 224, a duplicate speaker detector (DSD) application or software module 225, and an audio mute service (AMS) application or software module 226. As disclosed herein, the talker ID values generated by the talker ID application/software module 223 is used to detect and mitigate "double-join" and/or "playback" echo events. In selected embodiments, unique signatures of various users/talkers 201 may be created and enrolled, provided to network devices 203, 220, and/or stored of accessed by network devices 203, 220 to allow the talker ID application/software modules 204, 223 to verify an individual user/talker 201 by their unique signature. In addition, the talker ID comparison application/software module 224 receives and compares talker ID values identified at network devices 203, 220 within a predetermined timing comparison window. In addition, the duplicate speaker detector application/software module 225 detects the presence of duplicate talker ID values which indicate that a meeting participant's speaking voice is being captured by two or more network devices 203, 220. Finally, the audio mute service application/software module 226 selectively mutes audio devices (microphone and/or speaker) at one of the network devices where a duplicate talker ID value was generated or received.

Figure 3:
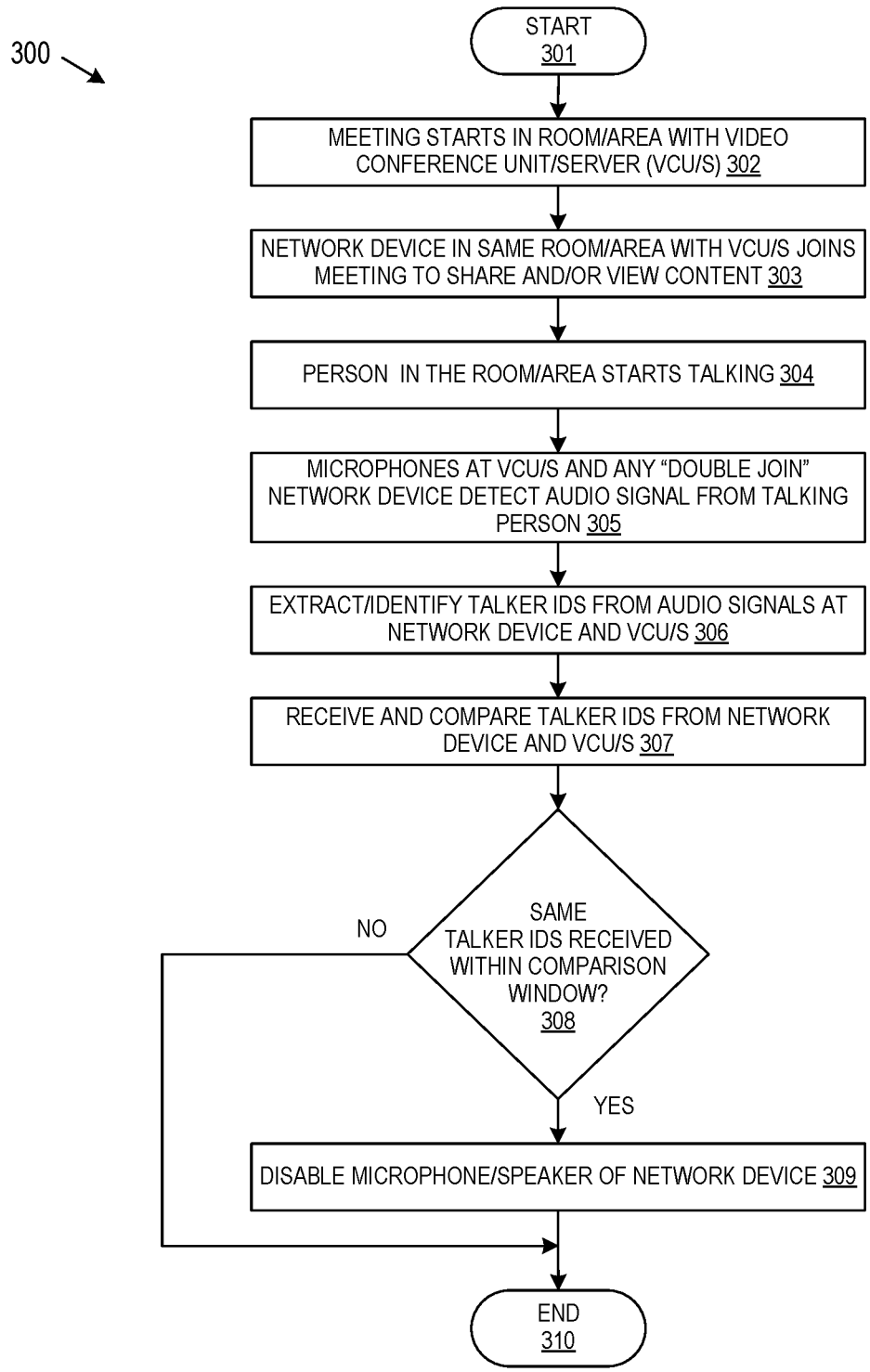
FIG. 3 is a flowchart showing the control logic for using talker ID values to detect and prevent double join video conferencing events in accordance with selected embodiments of the present disclosure.

To provide additional details for an improved understanding of selected embodiments of the present disclosure, reference is now made to FIG. 3 which shows a flowchart 300 of the control logic and method steps 301-310 for using talker ID values to detect and prevent double join video conferencing events. The order in which the control logic steps are described is not intended to be construed as a limitation, and any number of the described method steps may be combined in any order to implement the control logic and method steps.

At step 301, the method 300 starts. At step 302, a video/web conference call meeting starts in a conference room or area in which a video conference unit and/or conference server (VCU/S) is located to run the video/web conference call meeting.

At step 303, a network device in the same conference room or area with the VCU/S joins the video/web conference call meeting to share and/or view content. For example, a user located in the conference room/area with the VCU/S who needs to share or view content from the user's laptop may use the laptop as a network device to join the video/web conference call meeting. Upon joining, audio devices (microphone and speaker) at the joining network device are enabled to capture audio input signals and the playback audio output signals, resulting in a "double join" event when multiple participants (e.g., the VCU/S and the joined network device) have joined the same video/web conference call meeting from the same location.

At step 304, a meeting participant or person in the conference room or area starts talking during the video/web conference call meeting, thereby generating an audio speaking voice signal. Thus, the person speaking can be someone enters the room or area, and starts to talk during the video/web conference call meeting, either in the conference room/area or within microphone range of the remote network device.

At step 305, microphones at the VCU/S detect the audio speaking voice signal generated by the meeting participant or other speaker who is talking in the conference room/area. In addition, any "double join" network devices (e.g., a laptop) in the conference room/area which have enabled audio devices can also detect the audio speaking voice signal at step 305.

At step 306, talker ID values are extracted or identified from the detected audio speaking voice signals at the VCU/S and any audio-enabled network device(s). In selected embodiments, talker ID software that is installed on the VCU/S and on each laptop/endpoint generates a unique talker ID according to the audio speaking voice signal. In operation, the talker ID software is configured to associate the audio speaking voice signal with a unique talker ID data or unique signature that is specific to the speaker. In selected embodiments, the unique signature is associated with a number identifier, such as a unique 192 digit number. In selected embodiments, the talker ID values may be generated using any suitable speaker encoding model to recognize and identify a unique speaker associated with a speaking voice, including but not limited to the Emphasized Channel Attention, Propagation, and Aggregation in Time Delay Neural Network (ECAPA-TDNN) model which is based on a paper by B. Deplanques, et al. entitled "ECAPA-TDNN: Emphasized Channel Attention, Propagation and Aggregation in TDNN Based Speaker Verification" and open-sourced and trained by the SpeechBrain toolkit for Speaker Diarization application. By digitizing the audio speaking voice signal into a unique talker ID value, subsequent processing steps to perform duplicate speaker identification tasks can be efficiently performed without consuming computational resources to acquire, process, analyze and understand if duplicate audio speaking voice signals are being detected. In selected embodiments, the talker ID software may be configured to apply the ECAPA-TDNN algorithm on each 3-second interval of audio samples to generate talker ID values which uniquely identify the specific talker who is speaking. If desired, the generated talker ID values can be matched against a database of reference sound signatures to provide information on the identity of the talker. In other embodiments, it is sufficient to simply be able to distinguish the talker from the other talkers in the conference. Note that endpoints or servers may receive the talker ID values in a received audio stream through transmission of meta data, thereby reducing reduces the amount of processing needed in the device.

At step 307, the talker ID values from the network device(s) and the VCU/S are received and compared. As will be appreciated, the specific configuration for receiving and comparing talker ID values will depend on how and where the speaker identification/recognition technology (e.g., 112-115) is implemented. For example, if implemented on a video conference server (e.g., 110), then the talker ID values extracted or identified at step 306 may be sent, along with optional device info, to the video conference server from any network device where the talker ID values are generated. In this arrangement, the video conference server receives, at roughly the same time, the talker ID values that are generated from the same audio speaking voice signal by the video conference unit and network device. In other embodiments where the speaker identification/recognition technology is implemented at a remote network device (e.g., 220), the delivery and comparison of the talker ID values will be adjusted accordingly.

At step 308, a comparison is performed to determine if matching unique talker ID values are received within a defined timing comparison window. In selected embodiments, the video conference server processes the received talker ID values to determine if there is a match (e.g., the same talker ID values are received from the video conference unit and network device). If there is a match between the received talker ID values, this indicates that the voice is from the same person. In addition, the video conference server determines if the matching talker ID values from the video conference server and network device (e.g., laptop/endpoint) are received at the same time or at least substantially contemporaneously. In selected embodiments, the video conference server uses a defined timing comparison window to filter out or ignore unique talker ID values that are not received at the same time, leading to a determination that any network device generating a tardy talker ID value is not in the same room. As disclosed herein, the duration of the defined timing comparison window is controlled to detect if the two devices are in the same room or not. For example, the duration of the timing comparison window should account for (a) the distance between the talker and the 2 microphones (sound travels at about 1 foot per millisecond), (b) potentially different audio processing delays in the two network devices, and (c) potentially different network delays between the devices and the server (due to jitter, but also the case where the two devices are connecting on different networks). In a large conference room, the distance factor (a) could be about a 30 feet differential between the laptop and another microphone, leading to a 30 msec contribution. In addition, the audio processing delay factor (b) could add another 70 msec, and the network delay factor (c) could be about 100 msec if one connection is on cellular and the other is on broadband. With these factors, the timing comparison window should be approximately 200 msec in an operational use case where the talker IDs are continuously being assessed, but it will be appreciated that the duration of the timing comparison window may be tuned to a larger or shorter duration, depending on the network and conference room configuration being used. For example, the duration of the timing comparison window may range from 100-500 msec.

In selected embodiments, the talker ID algorithm used at step 306 requires a minimum assessment period (e.g., about 3 seconds) of speech to produce the output. If the talker ID algorithm were to run only once every three seconds, then the talker IDs would not be near-simultaneous (unless the polling was synchronized across the network with NTP or other means). But it will be appreciated that the talker ID algorithm can be run at a much faster polling rate (looking back over the past 3 seconds of audio). That would result in near-simultaneous production of the talker IDs.

If a determination is made that the talker ID values do not match and/or are not received at approximately the same time (negative outcome to detection step 308), the process 300 ends (step 310), and the VCU/S and any audio-enabled network device(s) continue listening for potential users to speak. However, if a determination is made that the talker ID values match and are received at approximately the same time (affirmative outcome to detection step 308), then this indicates that there is a duplicative or defective network device that is capturing duplicate audio speaking voice signals in the meeting room. At this point, the video conference server may retrieve data or information associated with the duplicate talker ID value, such as an IP address for the duplicative network device.

At step 309, the microphone and speaker of the duplicative network device which generated the duplicate talker ID value is disabled or muted. In selected embodiments, the video conference server mutes the microphone and speaker devices of the laptop/endpoint that is sending duplicative audio content after determining that the laptop/endpoint and video conference server are in the same room and in the same meeting.

And at step 310, the process 300 ends.

As described hereinabove, the control logic and method steps 301-310 may be implemented by installing talker ID software on each laptop/endpoint to generate unique talker ID values that are processed and compared at the video conference server to detect "double join" events. However, in other embodiments, the entire functionality for generating, detecting, and comparing talker ID values and for muting duplicative network devices can be implemented on the video conference unit or video conference server side without changing client applications at the network devices.

Figure 4:
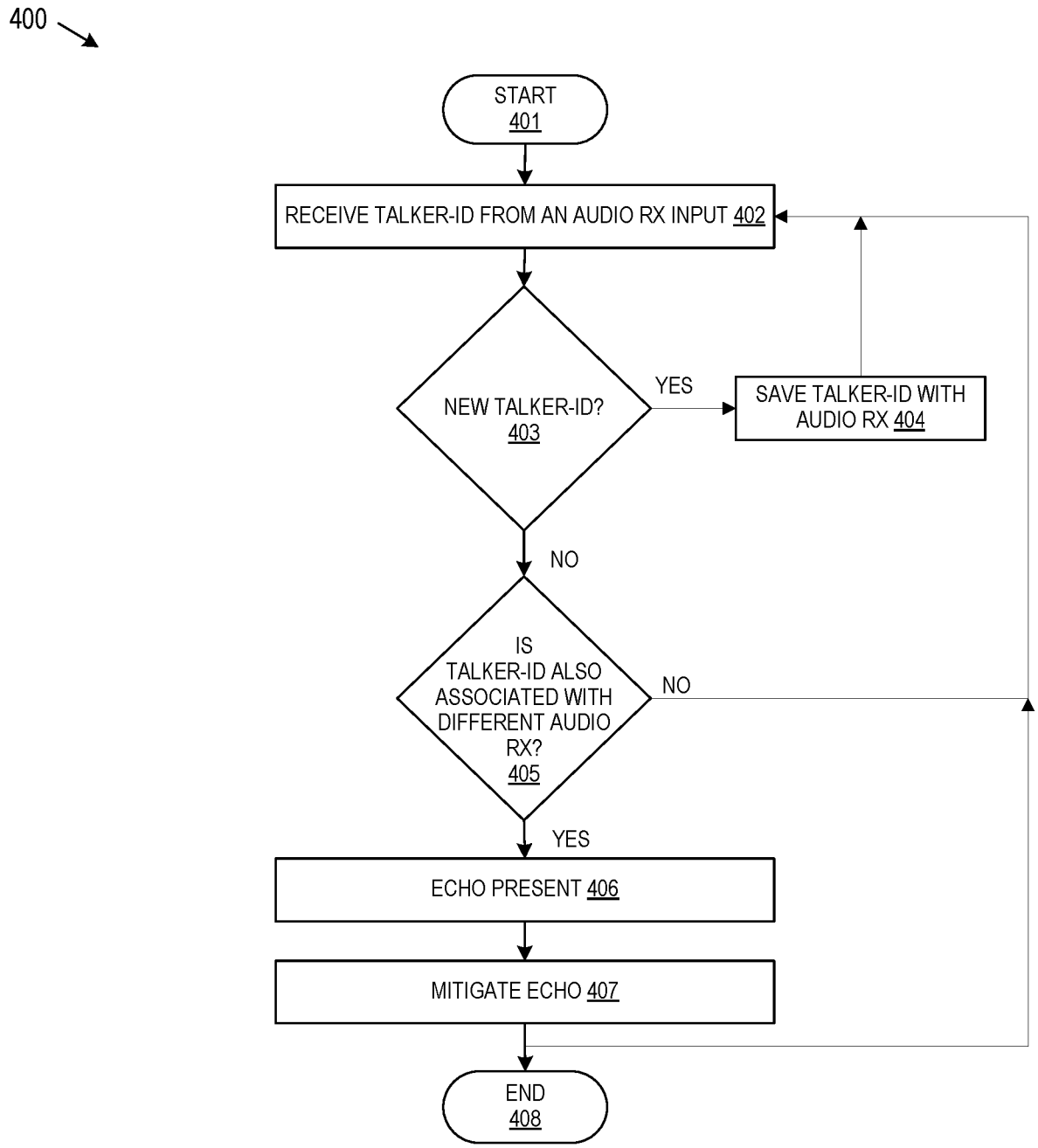
FIG. 4 is a flowchart showing the control logic for using talker ID values to detect and mitigate echo events with an audio mixer in accordance with selected embodiments of the present disclosure.

To provide additional details for an improved understanding of selected embodiments of the present disclosure, reference is now made to FIG. 4 which shows a flowchart 400 of the control logic and method steps 401-408 for using talker ID values to detect and mitigate echo events with an audio mixer. In the disclosed echo detection methodology, whenever an echo occurs, the same talker ID value will be detected at the inputs of the audio mixers. This method of detection can be used by a server or by an endpoint that receives audio streams from each device in the conference (as would be the case in a mesh conference). Whenever these signals from two or more endpoints carry the voice of the same talker, one or more of the endpoints are inducing an echo into the conference. The order in which the control logic steps are described is not intended to be construed as a limitation, and any number of the described method steps may be combined in any order to implement the control logic and method steps.

At step 401, the method 400 starts when a talker ID value is generated from a waveform generated by a talker that is detected at an input microphone. At step 402, an audio mixer receives a talker ID value from an audio mixer input (e.g., AUD RX1). At step 403, the audio mixer determines if the received talker ID value is a new talker ID value. If it is a new talker ID value (affirmative outcome to detection step 403), this indicates that the speaker is being detected for the first time, so the audio mixer saves the talker ID value with the associated audio mixer input (e.g., AUD RX1) at step 404 before returning to step 402 to monitor received talker ID values. However, if the talker ID value is not new (negative outcome to detection step 403), this indicates that the speaker has been detected, so the audio mixer determines if the received talker ID value is also associated with a different audio mixer input (e.g., AUD RX2) at step 405. If the received talker ID value is not also associated with a different audio mixer input (negative outcome to detection step 405), this indicates that there is no echo present, and the method returns to step 402 to monitor received talker ID values. However, if the received talker ID value is also associated with a different audio mixer input (affirmative outcome to detection step 405), this indicates that there is an echo present (step 406) in which case the audio mixer proceeds to mitigate the echo effect (step 407). As disclosed herein, the audio mixer may implement the echo mitigation step 407 by selectively disabling the microphone and/or speaker of the duplicative network device which generated the duplicate talker ID value, depending on whether a "double join" or "playback" echo effect was detected at step 406. After the echo mitigation step 407, the operation of the audio mixer may return to step 402 to monitor received talker ID values. Alternatively, the method may end (step 408).

In the disclosed methodology, echo mitigation may be implemented manually by configuring the audio mixer to provide the appropriate manual controls or prompts to the endpoint(s) which are sending the duplicate talker ID values for muting inputs and outputs at the endpoint(s). Alternatively, the audio mixer may provide the manual mute control prompts to the meeting host or conference administrator. An example embodiment of such manual mute control prompts could include a wizard that guides the individual mitigating the problem. As disclosed herein, "playback" echo mitigation arising from a failed echo canceller is different from the mitigation needed for "double-join" echoes. In the case of a failed echo canceller which causes a "playback" echo, it is sufficient for the audio mixer to mute the audio mixer input (AUD RX) from the endpoint network device which is creating the echo. However, in the case of a "double-join" echo, the audio mixer should either mute the audio mixer inputs (AUD RX1-n) from all endpoint network devices sending duplicate talker ID values, or should mute both the audio mixer input (AUD RX) and the audio mixer output (AUD TX) of the endpoint network device that has double-joined. In selected embodiments, the latter mitigation option is preferable.

Figure 5:
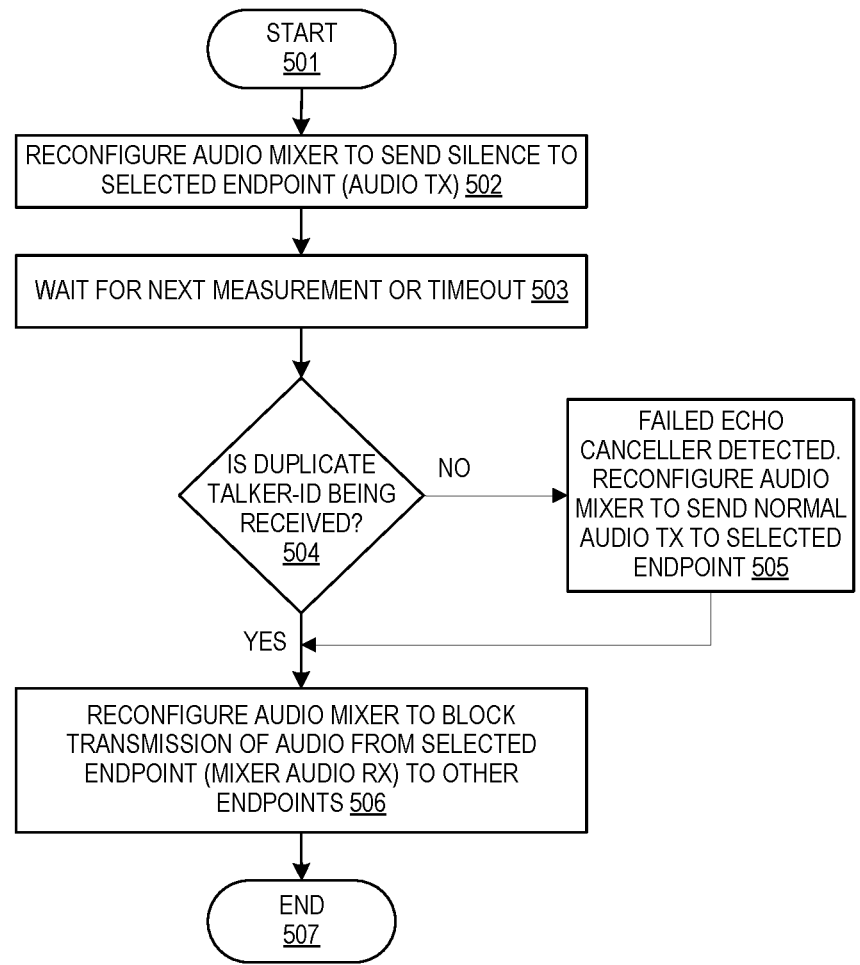
FIG. 5 is a flowchart showing the control logic for mitigating echo events with an audio mixer in accordance with selected embodiments of the present disclosure.

To provide additional details for an improved understanding of selected embodiments of the present disclosure, reference is now made to FIG. 5 which shows a flowchart 500 of the control logic and method steps 501-507 for mitigating echo events with an audio mixer. The order in which the control logic steps are described is not intended to be construed as a limitation, and any number of the described method steps may be combined in any order to implement the control logic and method steps.

At step 501, the method 500 starts when a duplicate talker ID is detected. At step 502, the audio mixer is reconfigured to send silence to the audio mixer output (AUD TX) of the selected endpoint network device which is sourcing the duplicate talker ID value, thereby preventing the selected endpoint network device from sending audio to any other endpoint network device on the conference call. If the echo canceller has failed, then the silencing of the audio mixer output (AUD TX) of the selected endpoint network device at step 502 will eliminate the echo. However, the user(s) of the selected endpoint network device will not hear any audio. In the case of a "double join" echo, duplicate talker ID values will still be detected even when the audio mixer output (AUD TX) of the selected endpoint network device is silenced. To step through these mitigation outcomes, the audio mixer waits for predetermined measurement time or timeout value (step 503) before the audio mixer determines whether a duplicate talker ID value is being received (step 504). If duplicate talker ID values are not detected during the measurement or timeout period (negative outcome to detection step 504), then the audio mixer has detected a failed echo canceler, at which point the audio mixer is reconfigured to re-enable the transmission of the normal audio mixer output (AUD TX) to the selected endpoint network device (step 505). However, if duplicate talker ID values are detected within the measurement or timeout period (affirmative outcome to detection step 504), then the audio mixer has detected a "double join" echo, at which point the audio mixer is reconfigured to block transmission of the audio (Audio RX) from the selected endpoint network device (step 506). As a result of step 506, the Audio RX from the selected endpoint is muted whether or not a duplicate talker ID value is detected at step 504, such as by reconfiguring the audio mixer to prevent the audio from being sent to any other endpoint at step 506.

Figure 6:
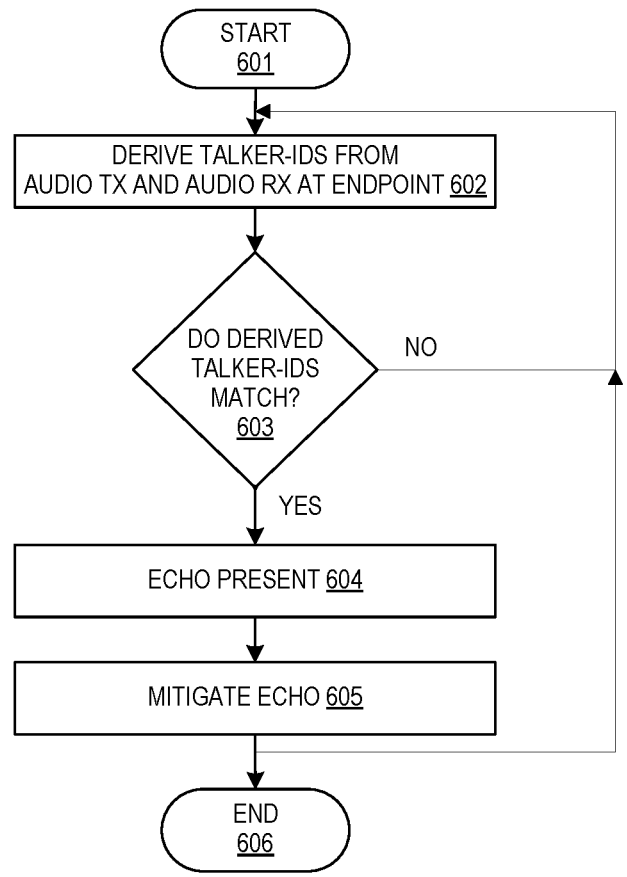
FIG. 6 is a flowchart showing the control logic for using talker ID values to detect and mitigate echo events at an endpoint network device in accordance with selected embodiments of the present disclosure.

As disclosed herein, an alternative way of detecting the presence of echo effects is to determine talker ID values from both the echo-canceled microphone input (Audio TX) and for the output audio (Audio RX or Mixed Audio RX) of an endpoint network device. In such embodiments, the talker ID value of the output audio may be determined by running the talker ID algorithm again or from received metadata. Either way, if the two talker ID values (from the AUD TX and AUD RX) match for any network device in the conference, then there is echo. Again, this echo detection technique can be implemented at either an endpoint network device or a video conference unit/server. However, one advantage of detecting "playback" echo effects at a single endpoint network device is that an echo can be detected even if the server and other endpoint network devices do not perform echo detection. To provide additional details for an improved understanding of selected embodiments of the present disclosure, reference is now made to FIG. 6 which shows a flowchart 600 of the control logic and method steps 601-606 for using talker ID values to detect and mitigate echo events at an endpoint network device with an audio mixer. In the disclosed echo detection methodology, the order in which the control logic steps are described is not intended to be construed as a limitation, and any number of the described method steps may be combined in any order to implement the control logic and method steps.

At step 601, the method 600 starts when a talker is detected at an endpoint network device. At step 602, an audio mixer at an endpoint network device derives a first talker ID value from an audio mixer output (e.g., AUD RX) and derives a second talker ID value from a microphone input (Audio TX). At step 603, the audio mixer determines if there is a match between the first and second talker ID values. If the derived talker ID values do not match (negative outcome to detection step 603), this indicates that there is no echo detected, so the audio mixer returns to step 602 to continue deriving talker ID values. However, if the derived talker ID values do match (affirmative outcome to detection step 603), this indicates that there is an echo present (step 604) in which case the audio mixer proceeds to mitigate the echo effect (step 605). As disclosed herein, the audio mixer may implement the echo mitigation step 605 by selectively disabling the microphone and/or speaker of the endpoint network device which generated the duplicate talker ID value, depending on whether a "double join" or "playback" echo effect was detected at step 604. After the echo mitigation step 605, the operation of the audio mixer may return to step 602 to continue deriving talker ID values. Alternatively, the method may end (step 606).

Figure 7:
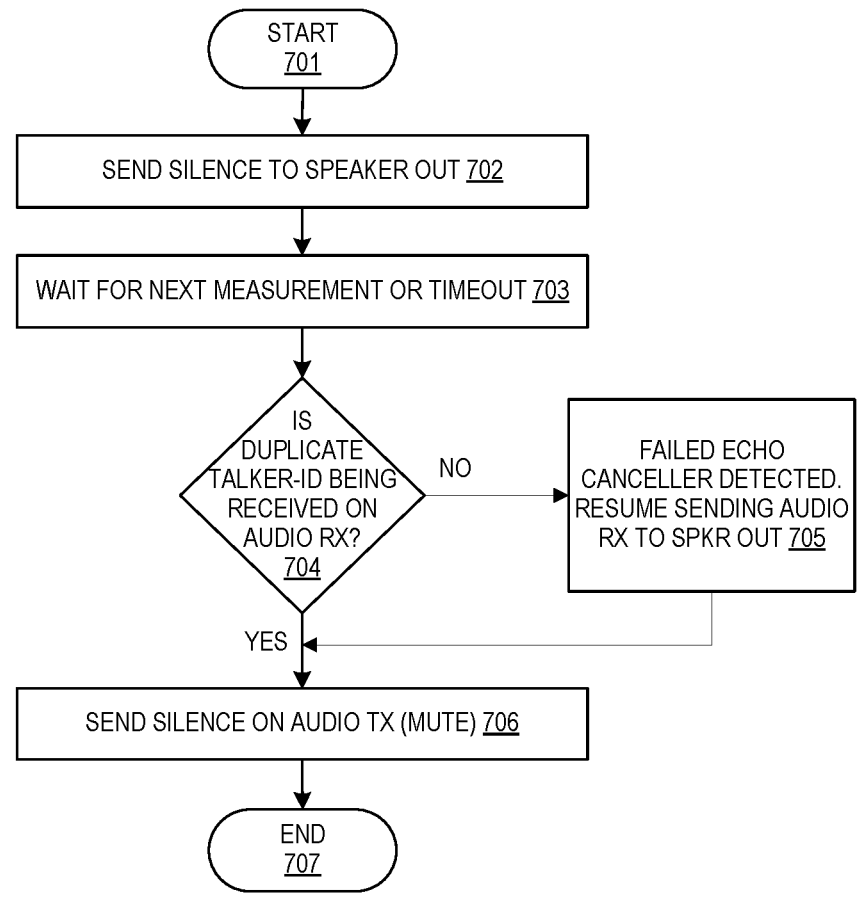
FIG. 7 is a flowchart showing the control logic for mitigating echo events at an endpoint network device in accordance with selected embodiments of the present disclosure.

As disclosed herein, the echo mitigation performed at step 605 can be done through manual controls to provide manual mute control prompts which guide the individual mitigating the problem, or through automatic means by configuring the audio mixer at the endpoint network device to mute either or both the audio mixer input (AUD RX) and the audio mixer output (AUD TX) of the endpoint network device, depending on whether a "playback" echo or "double join" echo is detected. To provide additional details for an improved understanding of selected embodiments of the present disclosure, reference is now made to FIG. 7 which shows a flowchart 700 of the control logic and method steps 701-707 for mitigating echo events with an audio mixer at an endpoint network device. The order in which the control logic steps are described is not intended to be construed as a limitation, and any number of the described method steps may be combined in any order to implement the control logic and method steps.

At step 701, the method 700 starts when a duplicate talker ID is detected. At step 702, the audio mixer sends silence to the audio (loudspeaker) output (SPKR OUT) at the endpoint network device which is sourcing the duplicate talker ID value, thereby preventing the endpoint network device from generating audio. Next, the audio mixer waits for predetermined measurement time or timeout value (step 703) before the audio mixer determines whether a duplicate talker ID value is being received (step 704). If a duplicate talker ID value is not detected from the received audio mixer input (AUD RX) during the measurement or timeout period (negative outcome to detection step 704), then the audio mixer has detected a failed echo canceler, at which point the audio mixer is reconfigured to resume sending the received audio mixer input (AUD RX) to the audio (loudspeaker) output (SPKR OUT) (step 705). However, if a duplicate talker ID value is detected from the received audio mixer input (AUD RX) within the measurement or timeout period (affirmative outcome to detection step 704), then the audio mixer has detected a "double join" echo, at which point the audio mixer is reconfigured to send silence on the audio mixer output (AUD TX) at step 706. As a result of step 706, the Audio TX from the endpoint network device is muted whether or not a duplicate talker ID value is detected at step 704.

In accordance with selected embodiments of the present disclosure, echo mitigation for "double join" and "playback" echo effects can be improved by knowing or inferring the location of the endpoint network devices (and human talkers) since "double join" echo effects can only occur when the two endpoints are in the same room. As will be appreciated, there are cases where the endpoint locations are known to a conference management application, and that information can be directly used to distinguish "double join" echo effects from "playback" echo effects caused by a failed echo canceller. In addition, location information can also be inferred using talker ID values as the audio/video conference proceeds. For example, if a talker ID value is detected in the uncanceled (Mic In) or echo-cancelled microphone signal (Audio TX) when there is no speech carried in the loudspeaker output (Audio RX, SPKR OUT), then the talker associated with that talker ID value must be local. Also, if the talker ID value is detected in the uncanceled microphone signal (Mic In) but is not detected in the cancelled microphone signal (Audio TX), then the talker must be remote (since a correctly working echo canceller has removed the speech of that talker from the loudspeaker output). However, if the same talker ID value is present in both the echo-cancelled microphone input and the loudspeaker output, then the location cannot be inferred, and must be assumed to be unknown. Since the uncanceled microphone signal is only available in the endpoint, the location of the talker cannot be inferred in a conferencing server. However, the endpoint can signal whether the talker is local or remote in metadata.

Figure 8:
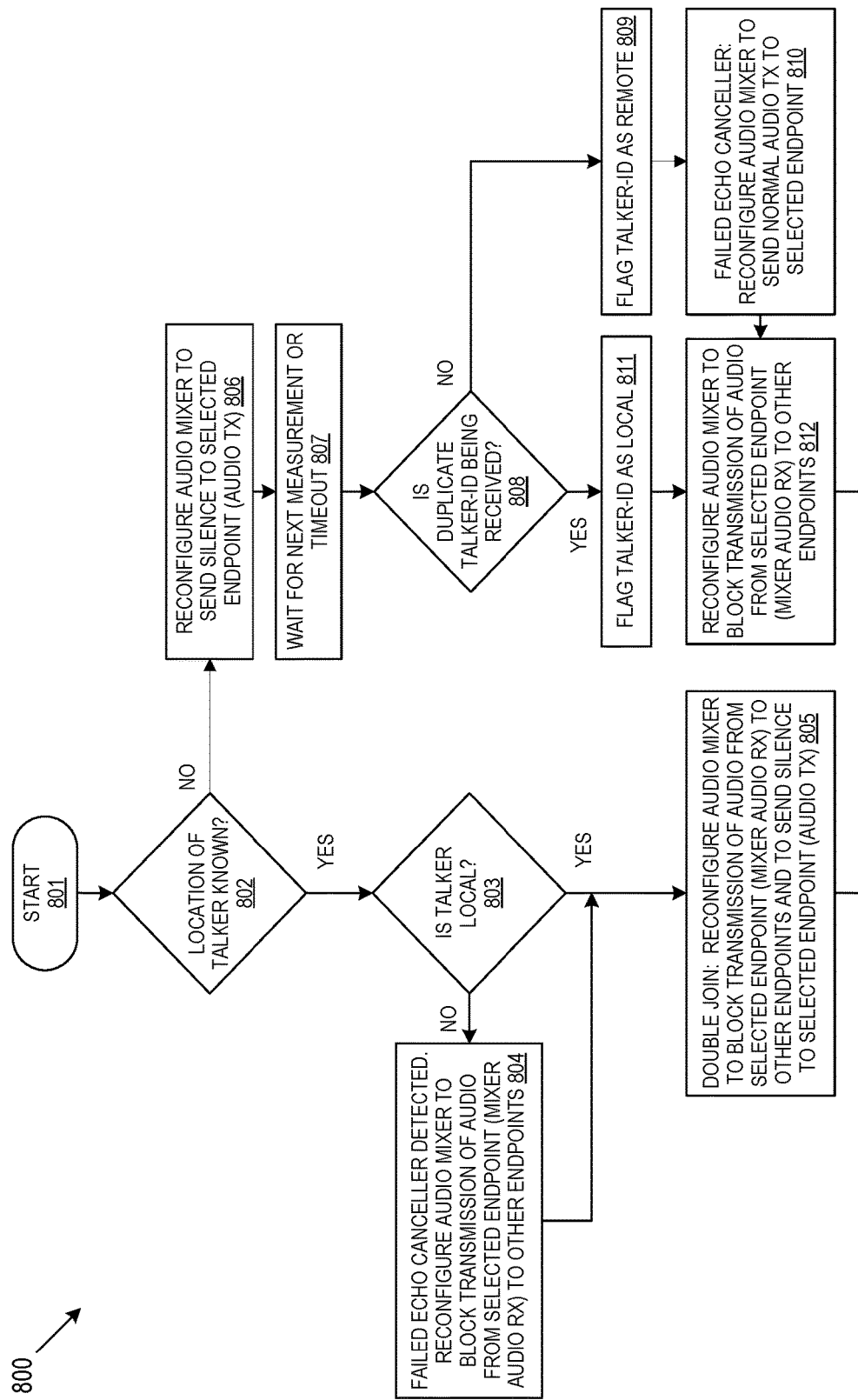
FIG. 8 is a flowchart showing the control logic for automatically mitigating "double-join" and "playback" echo effects at an audio mixer based on endpoint location information in accordance with selected embodiments of the present disclosure.

To illustrate selected embodiments for using location information to mitigate echo effects, reference is now made to FIG. 8 which shows a flowchart 800 of the control logic and method steps 801-813 for mitigating echo events with an audio mixer based on endpoint location information. The order in which the control logic steps are described is not intended to be construed as a limitation, and any number of the described method steps may be combined in any order to implement the control logic and method steps.

At step 801, the method 800 starts when a duplicate talker ID value is detected at an audio mixer of a network device or video conference unit/server. At step 802, the audio mixer determines if the location is known for the endpoint network device where the talker is located. If the talker location is known (affirmative outcome to detection step 802), then the audio mixer determines from the location information if the talker is "local" or in the same room as the matching talker ID value (step 803). If the duplicate talker ID value is from a non-local talker location (negative outcome to detection step 803), then the audio mixer has detected a failed echo canceler, at which point the audio mixer is reconfigured block transmission of audio from the duplicative network device which generated the duplicate talker ID value to other endpoint network devices (step 804). However, if the duplicate talker ID value is from a local talker location (affirmative outcome to detection step 803), then the audio mixer has detected a "double join" echo, at which point the audio mixer is reconfigured at step 805 to block transmission of audio from the duplicative network device (Mixer AUD RX) which generated the duplicate talker ID value to other endpoint network devices, and to also send silence to the audio mixer output (AUD TX) of the duplicative network device.

Going back to step 802, if the talker location is not known (negative outcome to detection step 802), then the audio mixer is reconfigured to send silence to the audio mixer output (AUD TX) of the selected endpoint network device which is sourcing the duplicate talker ID value, thereby preventing the selected endpoint network device from sending audio to any other endpoint network device on the conference call. Next, the audio mixer waits for predetermined measurement time or timeout value (step 807) before the audio mixer determines whether a duplicate talker ID value is being received (step 808). If a duplicate talker ID value is not detected from the received audio mixer input (AUD RX) during the measurement or timeout period (negative outcome to detection step 808), then the audio mixer may flag the location of the talker ID as "remote" (step 809) and may determine that a failed echo canceler is detected, at which point the audio mixer is reconfigured to send normal audio mixer output (AUD TX) to this endpoint network device (step 810). However, if a duplicate talker ID value is detected from the received audio mixer input (AUD RX) within the measurement or timeout period (affirmative outcome to detection step 808), then the audio mixer may flag the location of the talker ID as "local" (step 811) and may determine that a "double join" echo is detected (step 812), at which point the audio mixer is reconfigured to block transmission of the audio (Audio RX) from the selected endpoint network device to other endpoint network devices (step 812). As a result of step 812, the received audio mixer input (AUD RX) from the duplicative endpoint network device is blocked from transmission to other endpoints by the audio mixer whether or not a duplicate talker ID value is detected at step 808. At step 813, the method ends.

Figure 9:
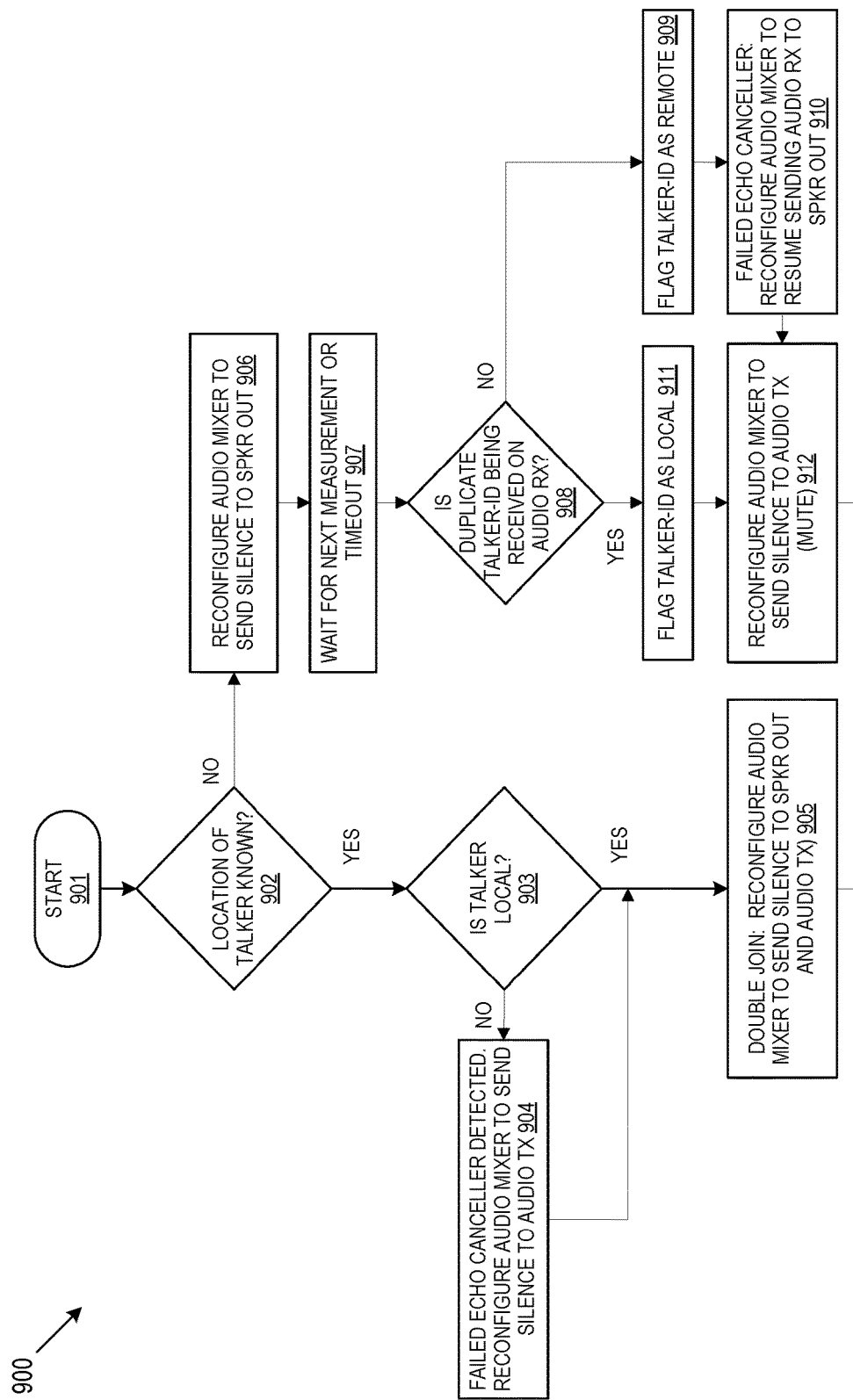
FIG. 9 is a flowchart showing the control logic for automatically mitigating "double-join" and "playback" echo effects at an endpoint network device based on endpoint location information in accordance with selected embodiments of the present disclosure.

To illustrate other selected embodiments for using location information to mitigate echo effects, reference is now made to FIG. 9 which shows a flowchart 900 of the control logic and method steps 901-913 for mitigating echo events at an endpoint network device based on endpoint location information. The order in which the control logic steps are described is not intended to be construed as a limitation, and any number of the described method steps may be combined in any order to implement the control logic and method steps.

At step 901, the method 900 starts when a duplicate talker ID value is detected at an audio mixer of an endpoint network device. At step 902, the audio mixer determines if the location is known for the endpoint network device where the talker is located. If the talker location is known (affirmative outcome to detection step 902), then the audio mixer determines from the location information if the talker is "local" or in the same room as the matching talker ID value (step 903). If the duplicate talker ID value is from a non-local talker location (negative outcome to detection step 903), then the audio mixer has detected a failed echo canceler, at which point the audio mixer is reconfigured send silence to the audio mixer output (AUD TX) of this endpoint network device (step 904). However, if the duplicate talker ID value is from a local talker location (affirmative outcome to detection step 903), then the audio mixer has detected a "double join" echo, at which point the audio mixer is reconfigured at step 905 to send silence to the audio speaker output SPKR OUT and the audio mixer output (AUD TX).

Going back to step 902, if the talker location is not known (negative outcome to detection step 902), then the audio mixer is reconfigured to send silence to the audio speaker output SPKR OUT of the endpoint network device which is sourcing the duplicate talker ID value. Next, the audio mixer waits for predetermined measurement time or timeout value (step 907) before the audio mixer determines whether a duplicate talker ID value is being received on the audio mixer input (AUD RX) (step 908). If a duplicate talker ID value is not detected from the received audio mixer input (AUD RX) during the measurement or timeout period (negative outcome to detection step 908), then the audio mixer may flag the location of the talker ID as "remote" (step 909) and may determine that a failed echo canceler is detected, at which point the audio mixer is reconfigured to resume sending the received audio mixer input (AUD RX) to the audio (loudspeaker) output (SPKR OUT) (step 910). However, if a duplicate talker ID value is detected from the received audio mixer input (AUD RX) within the measurement or timeout period (affirmative outcome to detection step 908), then the audio mixer may flag the location of the talker ID as "local" (step 911) and may determine that a "double join" echo is detected, at which point the audio mixer is reconfigured to send silence to the audio mixer output (AUD TX) at step 912. As a result of step 912, the Audio TX from the endpoint network device is muted whether or not a duplicate talker ID value is detected at step 908. At step 913, the method ends.

Figure 10:
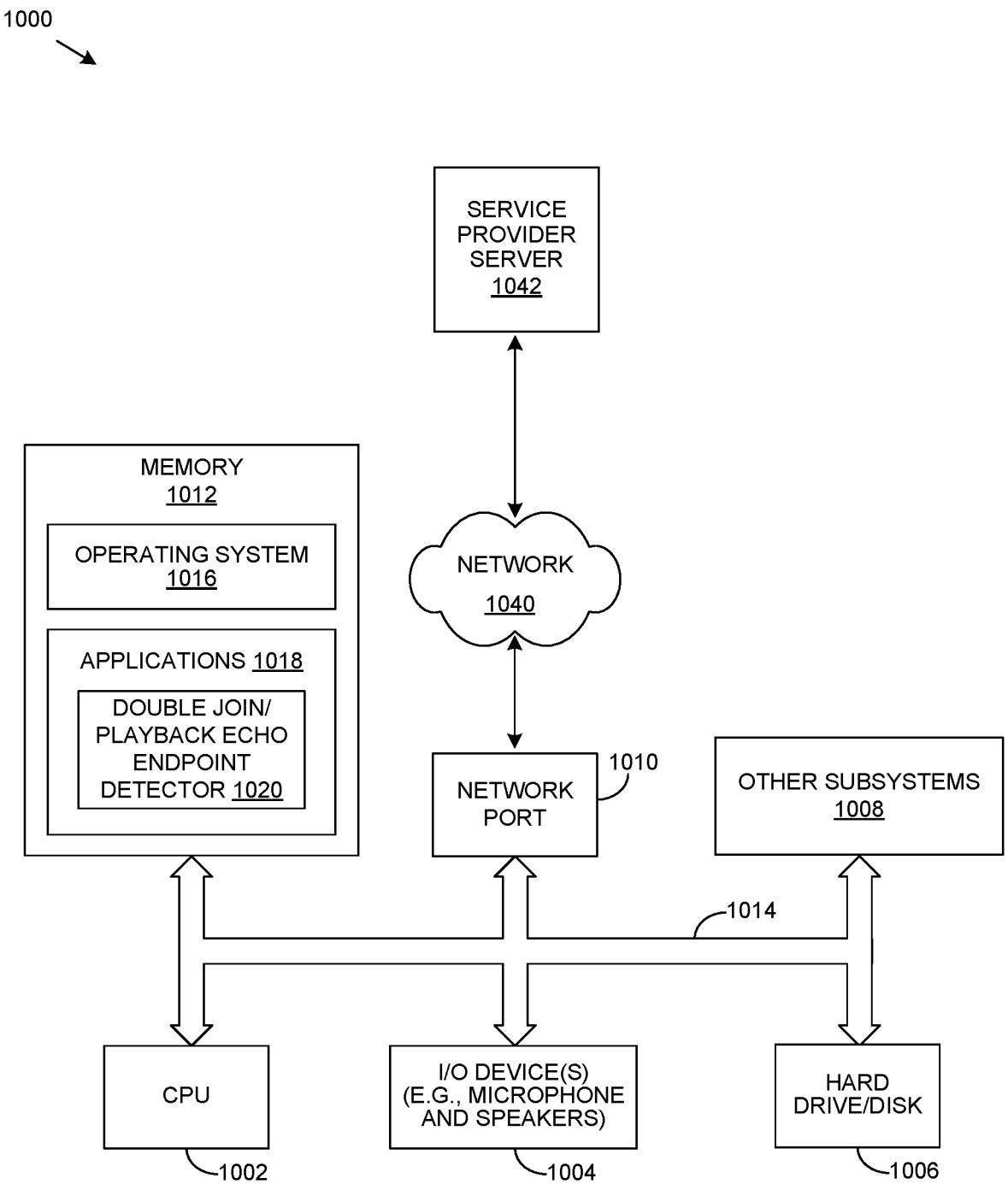
FIG. 10 is a schematic block diagram illustrating components of an information handling system in accordance with embodiments of the present disclosure.

Referring now to FIG. 10, there is depicted a schematic block diagram illustrating components of an information handling system 1000 that can be used to implement selected embodiments of the present disclosure. In selected embodiments, the information handling system 1000 may implement devices such as a notebook or laptop personal computer (PC), a smartphone, or other computing devices, such as network devices 103, 120, video conference unit/server device 110, and/or remote network device 120, 220, 220 as described herein.

As depicted, the information handling system 1000 includes a processor (e.g., central processor unit or "CPU") 1002, input/output (I/O) devices 1004, such as a microphone, a speaker(s), a keyboard, a video/display, a mouse, and associated controllers, a hard drive or disk storage 1006, and various other subsystems 1008. In addition, the information handling system 1000 may include a network port 1010 operable to connect to a network 1040, where network 1040 can include one or more wired and wireless networks, including the Internet. Network 1040 is likewise accessible by a service provider server 1042. The information handling system 1000 may also include system memory 1012, which is interconnected to the foregoing via one or more buses 1014. System memory 1012 can be implemented as hardware, firmware, software, or a combination of such. System memory 1012 further includes an operating system (OS) 1016. Embodiments provide for the system memory 1012 to include applications 1018.

In selected embodiments, the system memory 1012 may be implemented with flash memory and/or RAM which stores modules of different functionality in the form of software and firmware, generically programs, for controlling the system 1000. For example, the memory 1012 may include a double join/playback echo endpoint detector module 1020 which may include a talker ID application or software module for generating unique talker ID values from digitized voice signals captured by microphone device 1004. In addition or in the alternative, the double join/playback echo endpoint detector module 1020 may include a talker ID comparison service (for comparing talker ID values from different network devices), a duplicate talker ID detection service (for identifying the network device which generates a duplicate talker ID value), and an audio mute service (for muting or disabling the audio devices of the network device which generates the duplicate talker ID value).

In accordance with the present disclosure, there are numerous use cases which can benefit from using talker ID values to detect and prevent disrupting audio echo events during video/web conference call meetings.

A first "double join" use case arises when one or more people use their laptop(s) to join in a video/web conference call meeting that is being hosted by a video conference unit that is located in the same room as the one or more people. When a person in the room talks, duplicate copies of that person's unique talker ID are detected at the roughly at the same time by the video conference unit and that person's laptop when both include the talker ID application or software module for generating talker IDs. Alternatively, the speaking person's unique talker IDs may be detected at the roughly at the same time by a single server computer that includes a talker ID application or software module for generating talker IDs, where the single server computer is connected to receive digitized voice signals captured by the video conference unit and that person's laptop. Either way, the simultaneous detection of matching talker IDs provides an indication that the two or more devices are joined the same meeting in the same room. In response to detecting matching talker IDs within a defined timing window, the user of the laptop can be prompted to mute the laptop's mic and loudspeaker, or they can be muted automatically.

A second "double join" echo use case arises when someone joins a video/web conference call meeting for viewing content from their laptop that is located in the same room where the meeting is already in progress. When a person in the room speaks, that person's unique talker ID can be used to identify the joined laptop, and then prompt the joined laptop user with a popup message asking the user to mute the mic/loudspeaker. Alternatively, the joined laptop can be muted automatically.

A third use case arises for automatically detecting and muting "playback echo" events that are caused when an endpoint device produces echoes due to a malfunction in the echo canceller of the endpoint device which loops a delayed version of a person's speech which is output by the loudspeakers and recaptured by the microphone input of the endpoint device. In such cases, server software can detect the talker ID of the original speech (output by the loudspeakers) and the looped back version (echo) speech (input by the microphone), and can determine which are from the same person from two different endpoints. In addition, the server software can mitigate the echo endpoint by either automatically muting the echo endpoint or by generating a popup message on the echoing endpoint to remind the user his/her endpoint is generating echo and asking the user to mute. In selected embodiments of this use case, server software is connected and configured to receive a first digitized voice signal from a remote endpoint device, and to then detect that the first received digitized voice signal matches a second, previously captured digitized voice signal, at which point the server software may mute the remote endpoint device that is sending back the first received digitized voice signal. As an alternative to processing digitized voice signals, the server software may be configured to process talker ID values generated by the remote endpoint device(s). Either way, once the server software is able to determine that it is dealing with an echo, it identifies the network location of the remote endpoint device(s) to mute. Since the server software does know when endpoints join, it can tell that no one has joined recently. And it also can analyze the audio to tell which audio is coming in first. Alternatively, the server software can determine which talker ID is sent first, but this approach may not be as robust has having the server figure out which audio arrives first. In another alternative, the server software can monitor the talker ID for transmit audio content that is sent to a remote endpoint device(s) (e.g., talker IDs associated with the endpoint's RX audio) and also monitor the talker ID for receive audio content that is received from the same remote endpoint device(s) (e.g., talker IDs associated with the endpoint's TX audio). Upon detecting that the talker ID for receive audio content is a time-delayed match with the talker ID for transmit audio content, the server software detects that the remote endpoint device is an echo endpoint, and then provides a mute prompt or instruction.

By now it will be appreciated that there is disclosed herein a computer implemented method, system, and non-transitory processor readable memory containing programs that perform a method for controlling a video conference call. In the disclosed system and methodology, an audio speech signal is received at one or more network devices which are connected to the video conference call. The disclosed system and methodology also generate first and second unique talker identification values from the audio speech signal received at the one or more network devices. In selected embodiments, the first and second unique talker identification values are generated, respectively, at first and second network devices. In other embodiments, the first and second unique talker identification values are generated at a central server unit which is connected to receive digital versions of the audio speech signal from the one or more network devices. In selected embodiments, the first unique talker identification value is generated from a speaker output from an audio mixer of a first network device and the second unique talker identification value is generated by an echo canceller input to the audio mixer of the first network device. In selected embodiments, the first unique talker identification value is generated by generating a first multi-digit talker ID number in response to receiving the audio speech signal at a first network device, and generating associated first location data identifying a physical location of the first network device, where the first multi-digit talker ID number uniquely identifies a speaker associated with the audio speech signal. In other selected embodiments, the second unique talker identification value is generated by generating a second multi-digit talker ID number in response to receiving the audio speech signal at a second network device, and generating associated second location data identifying a physical location of the second network device, where the second multi-digit talker ID number uniquely identifies a speaker associated with the audio speech signal. In addition, the disclosed system and methodology compares the first and second unique talker identification values during a timing comparison window having a predetermined duration (e.g., within a range of approximately 100-500 msec.) to determine if the first and second unique talker identification values are identical and received at the same time or substantially contemporaneously. Finally, the disclosed system and methodology selectively mutes one or more audio devices at the one or more network devices if the first and second unique talker identification values are identical and received at the same time or substantially contemporaneously. In selected embodiments, the audio devices are selectively muted by muting microphone and loudspeaker devices at a first network device which generates the first unique talker identification value and which is located in a shared conference room with a second network device which generates the second unique talker identification value. In other embodiments, the audio devices are selectively muted by muting only microphone devices at a first network device which generates the first unique talker identification value and which is not located in a shared conference room with a second network device which generates the second unique talker identification value. In other embodiments, the audio devices are selectively muted by first muting an output loudspeaker audio device at a first network device which generated the first unique talker identification value in response to determining that the first and second unique talker identification values are identical and received at the same time or substantially contemporaneously; monitoring the one or more network devices, including the first network device, to detect a second audio speech signal during a predetermined measurement window; generating third and fourth unique talker identification values from the second audio speech signal received at the one or more network devices; comparing the third and fourth unique talker identification values during a second timing comparison window having the predetermined duration to determine if the third and fourth unique talker identification values are identical and received at the same time or substantially contemporaneously; unmuting the output loudspeaker audio device at the first network device if the third and fourth unique talker identification values are not identical and/or not received at the same time or substantially contemporaneously; and muting an input microphone audio device at the first network device.

In another form, there is disclosed herein a computer implemented method, system, and non-transitory processor readable memory containing programs that perform a method for controlling a video conference call. In the disclosed system and methodology, first and second unique talker identification values are generated from an audio speech signal that is generated by a talker and that is received at first and second network devices connected to the video conference call. In addition, the disclosed system/ methodology determines a first location of the first network device, and also determines a second location of the second network device. The disclosed system/methodology also mutes an output loudspeaker audio device at the first network device if the first and second unique talker identification values are identical and are received at the same time or substantially contemporaneously upon determining that the first location of the first network device is not local to the second location of the second network device. Finally, the disclosed system/methodology mutes an output loudspeaker audio device and an input microphone audio device at the first network device if the first and second unique talker identification values are identical and are received at the same time or substantially contemporaneously upon determining that the first location of the first network device is local to the second location of the second network device.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Unless stated otherwise, terms such as "first" and "second" are used to arbitrarily distinguish between the elements such terms describe. Thus, these terms are not necessarily intended to indicate temporal or other prioritization of such elements.

As will be appreciated by one skilled in the art, the present disclosure may be embodied as a method, system, or computer program product. Accordingly, embodiments of the present disclosure may be implemented entirely in hardware, entirely in software (including firmware, resident software, micro-code, etc.) or in an embodiment combining software and hardware. These various embodiments may all generally be referred to herein as a "circuit," "module," or "system." Furthermore, embodiments of the present disclosure may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present disclosure may be written in an object-oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the disclosure are described with reference to flowchart illustrations and/or step diagrams of methods, apparatus (systems) and computer program products according to embodiments of the disclosure. The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof.

It will be understood that each step of the flowchart illustrations and/or step diagrams, and combinations of steps in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Although the disclosure is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The various examples described are provided by way of illustration and should not be construed to limit the scope of the disclosure. Various modifications and changes can be made to the principles and examples described herein without departing from the scope of the disclosure and without departing from the claims which follow.

What is claimed is:

1. A computer-implementable method for controlling a video conference call, comprising
receiving an audio speech signal at one or more network devices which are connected to the video conference call;
generating first and second talker identification values from the audio speech signal received at the one or more network devices;
comparing the first and second talker identification values during a timing comparison window having a predetermined duration to determine if the first and second talker identification values are identical and received within a predetermined time of each other; and
selectively muting one or more audio devices at the one or more network devices in an escalating manner, the escalating manner comprising:
muting a first audio device of a first network device if the first and second talker identification values are identical and received within the predetermined time of each other; and
after muting the first audio device, determining whether to mute a second audio device of the first network device based on the first and second talker identification values being present and identical for an additional audio speech signal received at the one or more network devices after the first audio device is muted.

2. The computer-implementable method of claim 1, wherein the first and second talker identification values are generated, respectively, at the first network device and a second network device.

3. The computer-implementable method of claim 1, wherein the first and second talker identification values are generated at a central server unit which is connected to receive digital versions of the audio speech signal from the one or more network devices.

4. The computer-implementable method of claim 1, wherein the first talker identification value is generated from a speaker output from an audio mixer of the first network device and wherein the second talker identification value is generated by an echo canceller input to the audio mixer of the first network device.

5. The computer-implementable method of claim 1, wherein selectively muting the one or more audio devices comprises muting microphone and loudspeaker devices at the first network device which generates the first talker identification value and which is located in a shared conference room with a second network device which generates the second talker identification value.

6. The computer-implementable method of claim 1, wherein selectively muting the one or more audio devices comprises muting only microphone devices at the first network device which generates the first talker identification value and which is not located in a shared conference room with a second network device which generates the second talker identification value.

7. The computer-implementable method of claim 1, wherein the predetermined duration of the timing comparison window is within a range of 100-500 msec.

8. The computer-implementable method of claim 1, wherein generating the first talker identification value comprises:
generating a first multi-digit talker ID number in response to receiving the audio speech signal at the first network device, and
generating associated first location data identifying a physical location of the first network device,
where the first multi-digit talker ID number identifies a speaker associated with the audio speech signal.

9. The computer-implementable method of claim 8, wherein generating the second talker identification value comprises:
generating a second multi-digit talker ID number in response to receiving the audio speech signal at a second network device, and
generating associated second location data identifying a physical location of the second network device,
where the second multi-digit talker ID number identifies a speaker associated with the audio speech signal.

10. The computer-implementable method of claim 1, wherein selectively muting the one or more audio devices comprises:
muting an output loudspeaker audio device at the first network device which generated the first talker identification value in response to determining that the first and second talker identification values are identical and received within the predetermined time of each other;
monitoring the one or more network devices, including the first network device, to detect a second audio speech signal during a predetermined measurement window;
generating third and fourth talker identification values from the second audio speech signal received at the one or more network devices;
comparing the third and fourth talker identification values during a second timing comparison window having the predetermined duration to determine if the third and fourth talker identification values are identical and received within a predetermined time of each other;
unmuting the output loudspeaker audio device at the first network device if the third and fourth talker identification values are not identical and/or not received within the predetermined time of each other; and
muting an input microphone audio device at the first network device.

11. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations for controlling a video conference call and comprising instructions executable by the processor and configured for:

receiving an audio speech signal at one or more network devices which are connected to the video conference call;

generating first and second talker identification values from the audio speech signal received at the one or more network devices;

comparing the first and second talker identification values during a timing comparison window having a predetermined duration to determine if the first and second talker identification values are identical and received within a predetermined time of each other; and selectively muting one or more audio devices at the one or more network devices in an escalating manner, the escalating manner comprising:

muting a first audio device of a first network device if the first and second talker identification values are identical and received within the predetermined time of each other, and after muting the first audio device, determining whether to mute a second audio device of the first network device based on the first and second talker identification values being present and identical for an additional audio speech signal received at the one or more network devices after the first audio device is muted.

12. The system of claim 11, wherein the instructions executable by the processor are configured for selectively muting the one or more audio devices by muting microphone and loudspeaker devices at the first network device which generates the first talker identification value and which is located in a shared conference room with a second network device which generates the second talker identification value.

13. The system of claim 11, wherein the instructions executable by the processor are configured for selectively muting the one or more audio devices by muting only microphone devices at the first network device which generates the first talker identification value and which is not located in a shared conference room with a second network device which generates the second talker identification value.

14. The system of claim 11, wherein the instructions executable by the processor are configured for generating the first talker identification value by:

generating a first multi-digit talker ID number in response to receiving the audio speech signal at the first network device, and generating associated first location data identifying a physical location of the first network device, where the first multi-digit talker ID number identifies a speaker associated with the audio speech signal.

15. The system of claim 11, wherein the instructions executable by the processor are configured for selectively muting one or more audio devices by:

muting an output loudspeaker audio device at the first network device which generated the first talker identification value in response to determining that the first and second talker identification values are identical and received within the predetermined time of each other;

monitoring the one or more network devices, including the first network device, to detect a second audio speech signal during a predetermined measurement window;

generating third and fourth talker identification values from the second audio speech signal received at the one or more network devices;

comparing the third and fourth talker identification values during a second timing comparison window having the predetermined duration to determine if the third and fourth talker identification values are identical and received within the predetermined time of each other; and unmuting the output loudspeaker audio device at the first network device if the third and fourth talker identification values are not identical or are not received within the predetermined time of each other; and muting an input microphone audio device at the first network device.

16. A non-transitory processor readable memory containing programs that when executed cause a processor or processors to perform a method for controlling a video conference call, the method comprising:

receiving an audio speech signal at one or more network devices which are connected to the video conference call;

generating first and second talker identification values from the audio speech signal received at the one or more network devices;

comparing the first and second talker identification values during a timing comparison window having a predetermined duration to determine if the first and second talker identification values are identical and received within a predetermined time of each other; and selectively muting one or more audio devices at the one or more network devices in an escalating manner, the escalating manner comprising:

muting a first audio device of a first network device if the first and second talker identification values are identical and received within the predetermined time of each other; and after muting the first audio device, determining whether to mute a second audio device of the first network device based on the first and second talker identification values being present and identical for an additional audio speech signal received at the one or more network devices after the first audio device is muted.

17. The non-transitory processor readable memory of claim 16, wherein selectively muting the one or more audio devices comprises muting microphone and loudspeaker devices at the first network device which generates the first talker identification value and which is located in a shared conference room with a second network device which generates the second talker identification value.

18. The non-transitory processor readable memory of claim 16, wherein selectively muting the one or more audio devices comprises muting only microphone devices at the first network device which generates the first talker identification value and which is not located in a shared conference room with a second network device which generates the second talker identification value.

19. The non-transitory processor readable memory of claim 16, wherein generating the first talker identification value comprises:

generating a first multi-digit talker ID number in response to receiving the audio speech signal at the first network device, and generating associated first location data identifying a physical location of the first network device, where the first multi-digit talker ID number identifies a speaker associated with the audio speech signal.

20. The non-transitory processor readable memory of claim 16, wherein selectively muting the one or more audio devices comprises:
- muting an output loudspeaker audio device at the first network device which generated the first talker identification value in response to determining that the first and second talker identification values are identical and received within the predetermined time of each other;
- monitoring the one or more network devices, including the first network device, to detect a second audio speech signal during a predetermined measurement window;
- generating third and fourth talker identification values from the second audio speech signal received at the one or more network devices;
- comparing the third and fourth talker identification values during a second timing comparison window having the predetermined duration to determine if the third and fourth talker identification values are identical and received within the predetermined time of each other; and
- unmuting the output loudspeaker audio device at the first network device if the third and fourth talker identification values are not identical and/or not received within the predetermined time of each other; and
- muting an input microphone audio device at the first network device.

21. A computer-implementable method for controlling a video conference call, comprising

- generating first and second talker identification values from an audio speech signal that is generated by a talker and that is received at first and second network devices connected to the video conference call;
- determining a first location of the first network device;
- determining a second location of the second network device;
- determining if the first location is local to the second location;
- selectively muting one or more audio devices of the first network device, wherein selectively muting the one or more audio devices comprises:
  - muting an output loudspeaker audio device at the first network device if the first and second talker identification values are identical and are received within a predetermined time of each other upon determining that the first location of the first network device is not local to the second location of the second network device; and
  - muting the output loudspeaker audio device and an input microphone audio device at the first network device if the first and second talker identification values are identical and are received within a predetermined time of each other upon determining that the first location of the first network device is local to the second location of the second network device.

* * * * *